United States Patent
Tabata et al.

(10) Patent No.: US 7,363,580 B2
(45) Date of Patent: Apr. 22, 2008

(54) INTERMEDIATE ADDRESS TABLE FOR CONVERTING POSITION INFORMATION TO AN ADDRESS OF A LINK STRUCTURE CORRELATED INFORMATION FILE ON A HYPERTEXT DOCUMENT

(75) Inventors: Yasuhiro Tabata, Kanagawa (JP); Takashi Yano, Tokyo (JP); Hisashi Ishijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 239 days.

(21) Appl. No.: 10/361,771

(22) Filed: Feb. 11, 2003

(65) Prior Publication Data

US 2003/0121006 A1 Jun. 26, 2003

Related U.S. Application Data

(63) Continuation of application No. 09/023,702, filed on Feb. 13, 1998, now Pat. No. 6,537,324.

(30) Foreign Application Priority Data

Feb. 17, 1997 (JP) ................................. 9-031901

(51) Int. Cl.
*G06F 15/00* (2006.01)
(52) U.S. Cl. .................. 715/513; 715/501.1; 715/522
(58) Field of Classification Search ............ 715/500.1, 715/509, 513, 760, 522, 501.1; 358/1.1
See application file for complete search history.

(56) References Cited

U.S. PATENT DOCUMENTS

| | | | |
|---|---|---|---|
| 5,603,025 A | * | 2/1997 | Tabb et al. .................. 707/2 |
| 6,356,923 B1 | | 3/2002 | Yano et al. ................ 717/127 |
| 6,537,324 B1 | * | 3/2003 | Tabata et al. .............. 715/513 |

OTHER PUBLICATIONS

U.S. Appl. No. 10/361,771, filed Feb. 11, 2003, Tabata et al.
U.S. Appl. No. 10/871,731, filed Jun. 21, 2004, Yano et al.

* cited by examiner

*Primary Examiner*—Cesar Paula
(74) *Attorney, Agent, or Firm*—Oblon, Spivak, McClelland, Maier & Neustadt, P.C.

(57) ABSTRACT

The document information management system according to the present invention comprises a hypertext preparing unit for preparing a hypertext; a file unit for storing therein correlated information files; a medium form information preparing unit for preparing medium for information from information in the hypertext; a medium form output unit for outputting the recording paper as a medium form; a selection information adding unit for adding selection information; a reader for reading the selection information and linkage information from the medium form; a retrieving unit for retrieving an appropriate correlated information file; and an output unit for outputting the correlated information file retrieved by the retrieving unit.

14 Claims, 28 Drawing Sheets

TABLE OF LINKAGE INFORMATION
(TABLE OF DICON-ID ADDRESS CONVERSION)

| DESCRIBED POSITION INFORMATION (DICON NUMBER) | ADDRESS INFORMATION (ADDRESS OF CORRELATED INFORMATION FILE) |
|---|---|
| 01 | http://f002002.ricoh.co.jp |
| 02 | http://f004588.ricoh.co.jp |
| 03 | http://f003224.ricoh.co.jp |
| 04 | http://f009896.ricoh.co.jp |
| 05 | http://f001124.ricoh.co.jp |
| . | . |
| . | . |
| 17 | http://f006520.ricoh.co.jp |

FIG.7

TABLE OF LINKAGE INFORMATION
(TABLE OF DICON-ID ADDRESS CONVERSION)

| DESCRIBED POSITION INFORMATION (DICON NUMBER) | ADDRESS INFORMATION (ADDRESS OF CORRELATED INFORMATION FILE) |
|---|---|
| 01 | http://f002002.ricoh.co.jp |
| 02 | http://f004588.ricoh.co.jp |
| 03 | http://f003224.ricoh.co.jp |
| 04 | http://f009896.ricoh.co.jp |
| 05 | http://f001124.ricoh.co.jp |
| · | · |
| · | · |
| 17 | http://f006520.ricoh.co.jp |

FIG.8A

TABLE OF LINKAGE INFORMATION

| DESCRIBED POSITION INFORMATION (DICON NUMBER) | DESCRIPTION RECOGNIZING INFORMATION (DICON ID) |
|---|---|
| 01 | 001325 |
| 02 | 001911 |
| 03 | 001326 |
| 04 | 001328 |
| 05 | 003002 |
| ⋮ | ⋮ |
| 17 | 005014 |

FIG.8B

TABLE OF DICON-ID ADDRESS CONVERSION

| DESCRIPTION RECOGNIZING INFORMATION (DICON ID) | ADDRESS INFORMATION (ADDRESS OF CORRELATED INFORMATION FILE) |
|---|---|
| 001325 | http://f002002.ricoh.co.jp |
| 001911 | http://f004588.ricoh.co.jp |
| 001326 | http://f003224.ricoh.co.jp |
| 001328 | http://f009896.ricoh.co.jp |
| 003002 | http://f001124.ricoh.co.jp |
| ⋮ | ⋮ |
| 005014 | http://f006520.ricoh.co.jp |

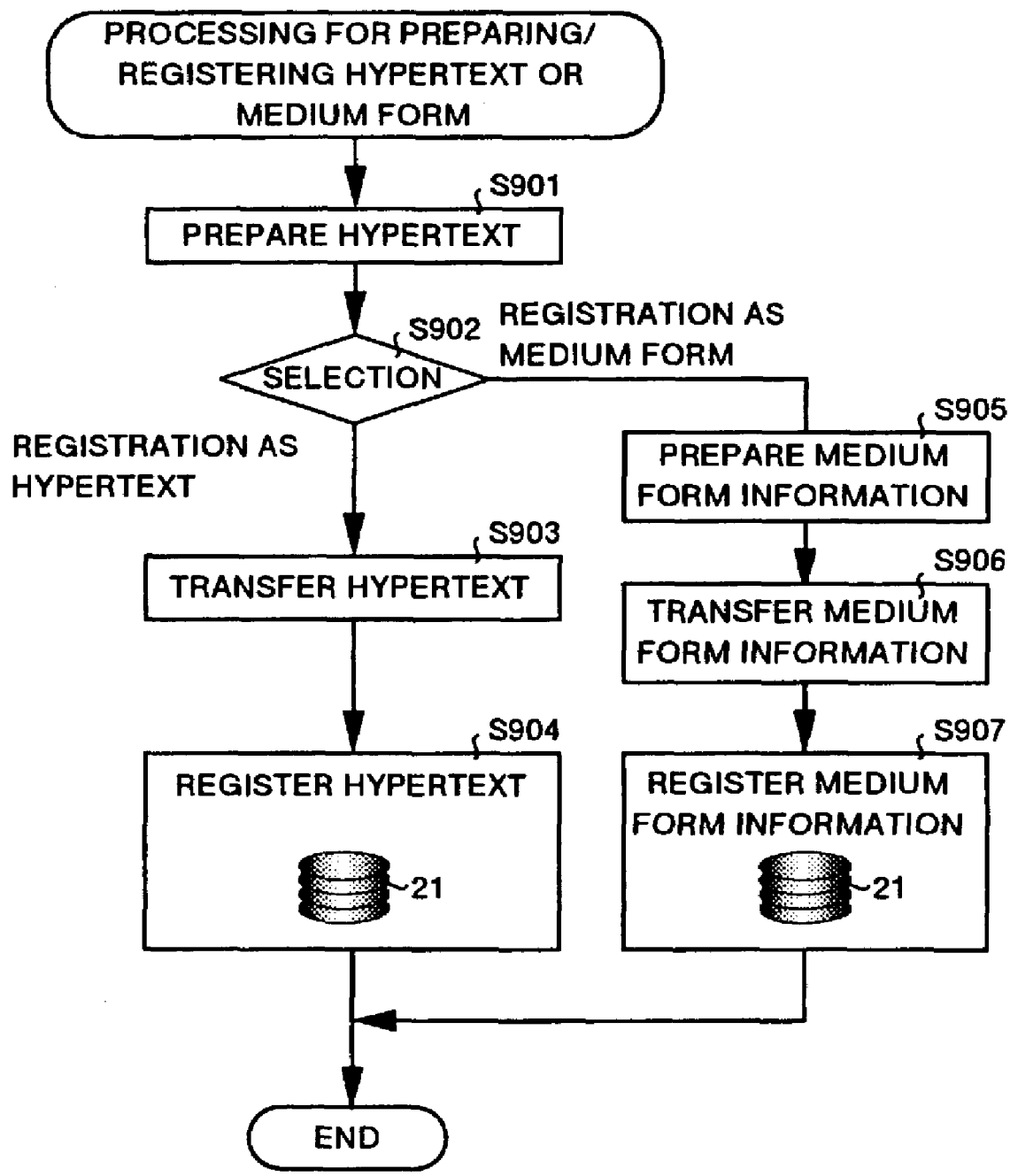

FIG.15

FILE UNIT SPECIFYING INFORMATION

| FILE UNIT IDENTIFYING INFORMATION | HYPERTEXT IDENTIFYING INFORMATION | VERSION INFORMATION |
|---|---|---|
| DEVICE ADDRESS | NAME OF HYPERTEXT | Ver.2 |

FIG.16A

ACCESS TO FILE WITH INFORMATION SHARED (FILE SERVER 20A)

* IDENTIFY FILE SERVER 20A FROM FILE UNIT SPECIFYING INFORMATION

* IDENTIFY DESCRIPTION RECOGNIZING INFORMATION FROM SELECTION INFORMATION AND LINKAGE INFORMATION TABLE
* TRANSFER DESCRIPTION RECOGNIZING INFORMATION TO FILE SERVER 20A

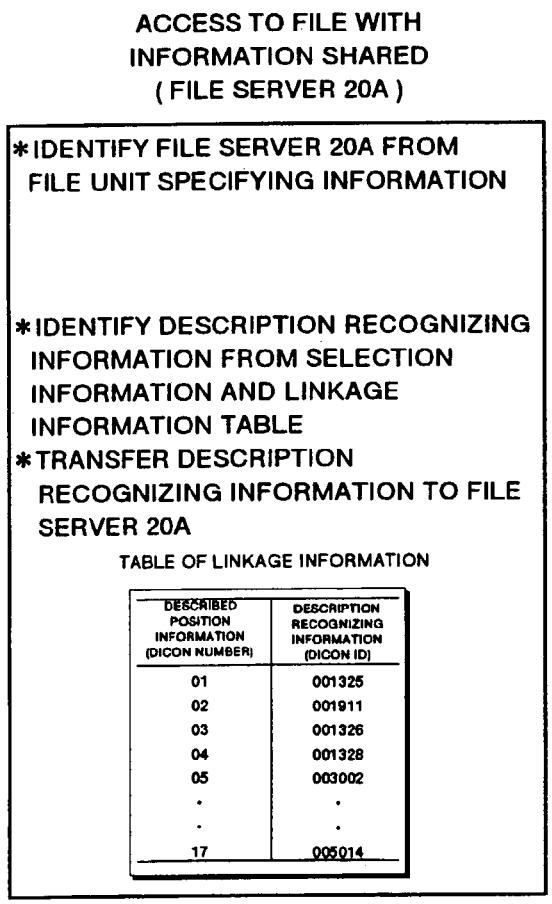

* IDENTIFY ADDRESS INFORMATION (URL) FROM DESCRIPTION RECOGNIZING INFORMATION

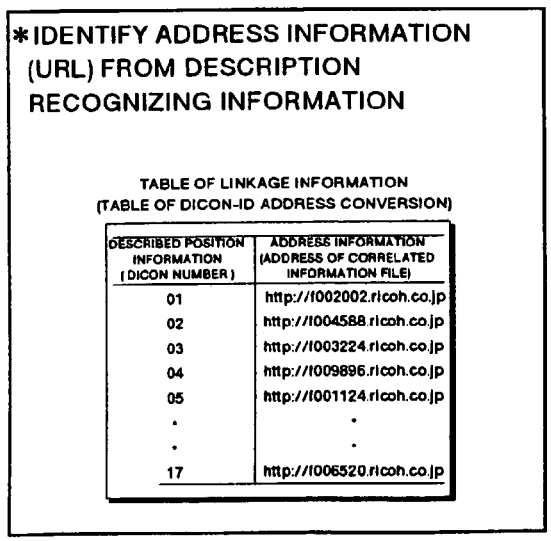

FIG.16B

ACCESS TO LOCAL AND PERSONAL FILE (FILE DEVICE 20B)

* IDENTIFY FILE SERVER 20B FROM FILE UNIT SPECIFYING INFORMATION

⇓

* IDENTIFY DESCRIPTION RECOGNIZING INFORMATION FROM SELECTION INFORMATION AND LINKAGE INFORMATION TABLE
* TRANSFER DESCRIPTION RECOGNIZING INFORMATION TO FILE DEVICE 20B

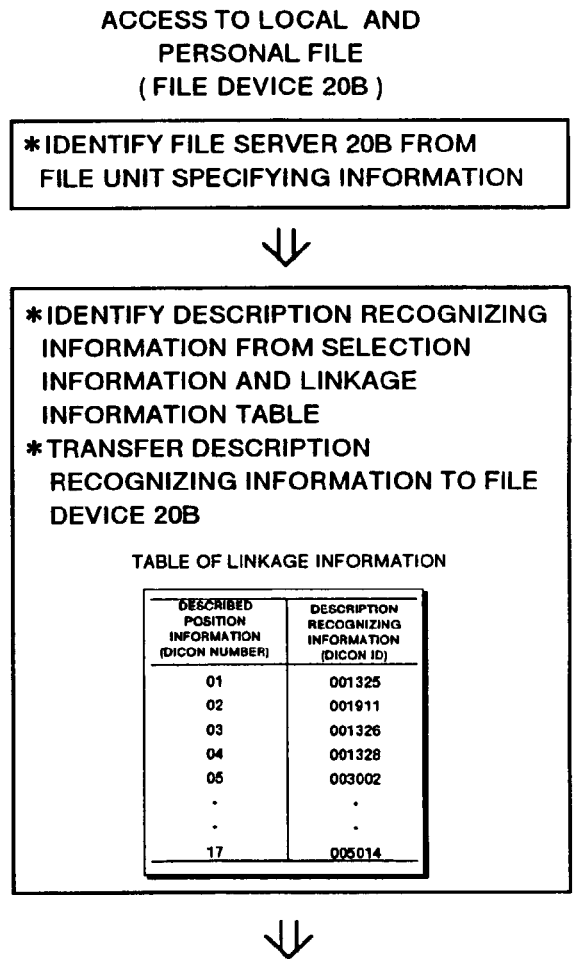

⇓

* IDENTIFY ADDRESS INFORMATION (LOCAL FILE ADDRESS) FROM DESCRIPTION RECOGNIZING INFORMATION

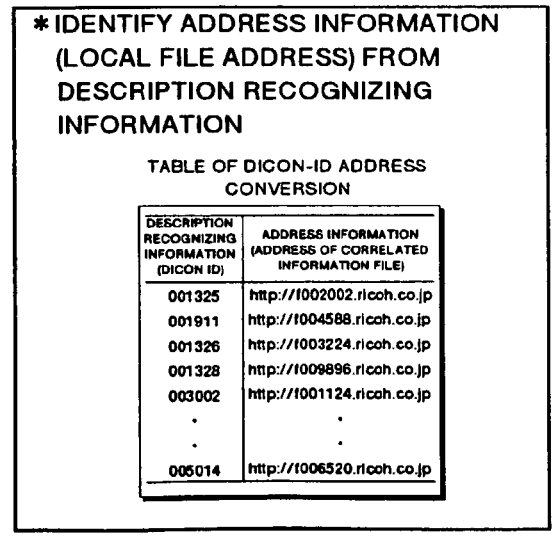

FIG.25
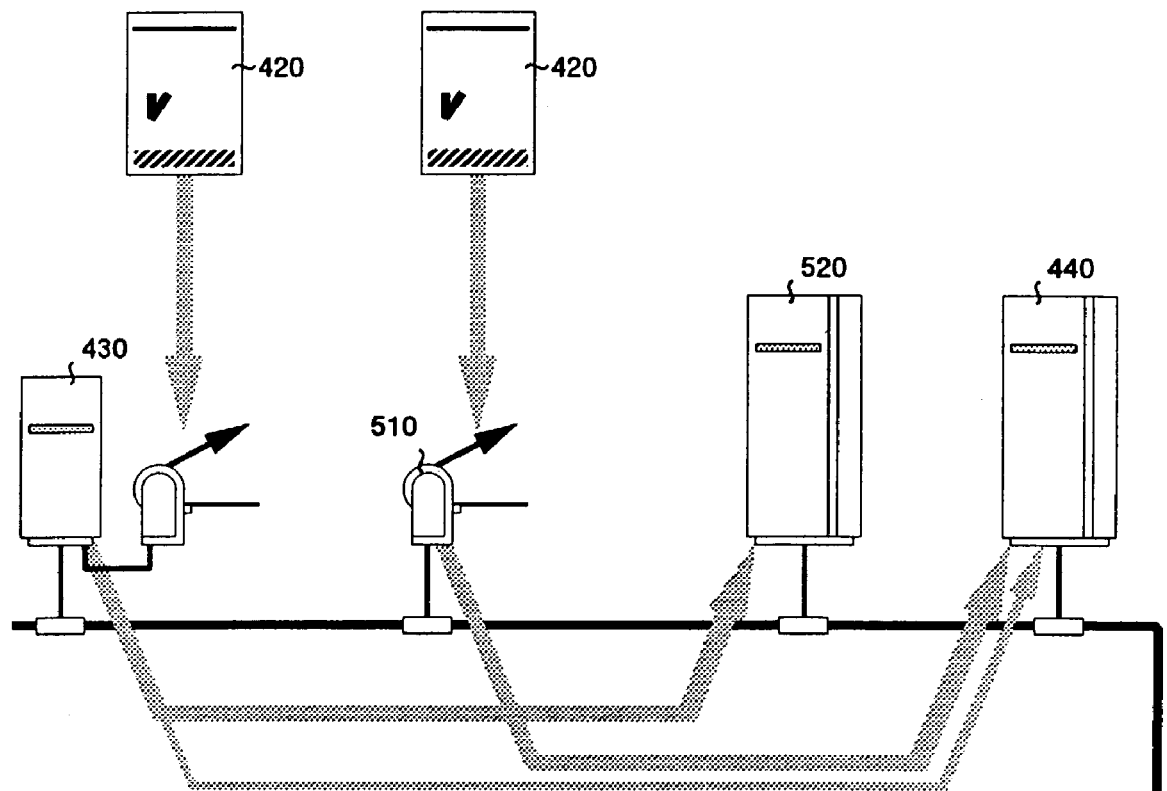
CORRELATED INFORMATION FILE
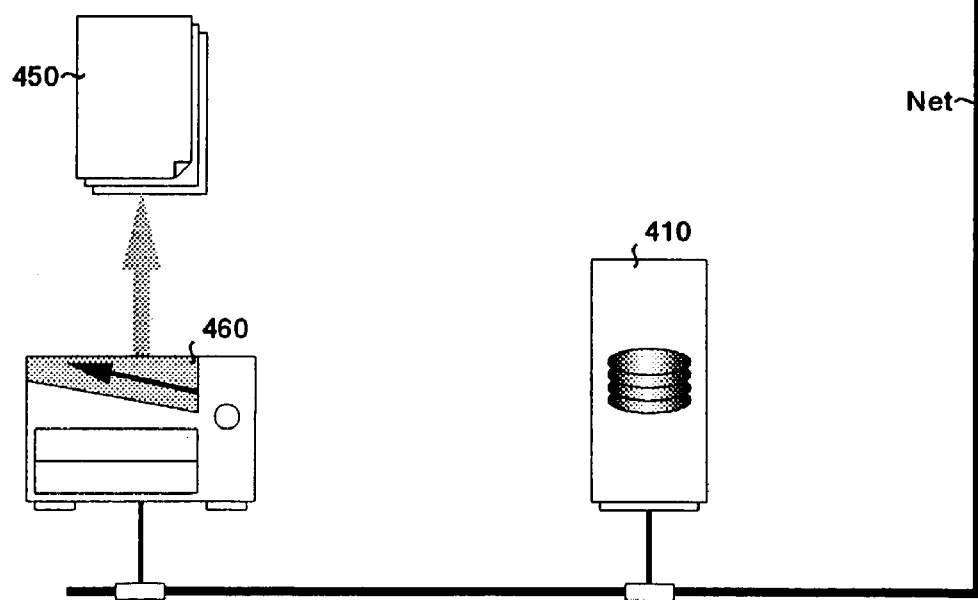
Net

INTERMEDIATE ADDRESS TABLE FOR CONVERTING POSITION INFORMATION TO AN ADDRESS OF A LINK STRUCTURE CORRELATED INFORMATION FILE ON A HYPERTEXT DOCUMENT

FIELD OF THE INVENTION

The present invention relates to a document information management system managing document information printed on a paper, and more particularly to a document information management system with improved relation between a human and environment for a computer system (HCI: Human-Computer-Interaction) using paper on which a document is recorded (medium form).

BACKGROUND OF THE INVENTION

In recent years, in association with progress in the fields of computer-related technology and man-machine interface or with improvement in network environment, more and more documents have been electronized, and also in association with the technological progress, the tendency for paper-less environment in business offices has been promoted.

To describe the situation more concretely, various types of document are prepared (electronized) on a screen of a personal computer/work station, and such operations as editing, copying, transferring, sharing, filing, proofreading, and retrieving the electronized document information can easily be executed in a computer system (in a digitalized world or in a virtual reality). Especially with development of a network, now it is possible to distribute (transfer) an electronized document to each individual without outputting the document with such a device as a printer, which further promotes the tendency for paper-less environment in offices.

Also an electronized document can automatically and systematically be managed by a document information management system built in a computer, so the works for sorting stored documents or retrieving a document which a user hopes to read have become easier, and further there are provided the advantages such as reduction of a total volume of documents by sharing documents among a plurality of users, improvement in security of secret documents by setting a password or the like, and correlation of a plurality of documents to each other.

However, although electronized documents provide. various merits, when compared to a document outputted on actual recording paper (described as paper document hereinafter), there are various types of restriction in easiness to read; portability, easiness to be handled, environmental conditions for its availability, or continuity to actual work, and for this reason, when using an electronized document for an actual job, in many cases it is more efficient to output the electronized document with a printer or the like on recording paper once and then use it as a paper document. So, in the office environment in the future, paper documents and electronized documents would coexist and be used according to a purpose of each job.

With the conventional technology, however, as there is no continuity or correlation of information as digital information between the digital world such as a computer system and paper documents, there have been the problems as described below.

At first, even when electronized documents are put under management by a document information management system built in the digital world, once an electronized document is outputted as a paper document, the correlated information which the electronized document has, such as address information, security information such as a password, and linkage information for linking the document to other document each in the document information management system disappear, and for this reason the paper document has only a value as output from the document information management system.

Secondly, as it is impossible to directly access the digital world using a paper document as a medium, it is required for a user to operate a keyboard or the like to access it, which means low convenience in actual use.

Although there has been a method to directly access the digital world using paper as a medium like in a case of a mark sheet, as a previously formatted and dedicated mark sheet is used, there are various restrictions in actual use, and it can not be used as a general document.

Thirdly, in the digital world, there is a hypertext document based on an advanced concept for an electronized document, but when this hypertext document is outputted as a paper document, only visualized two-dimensional information is outputted and original information as a hypertext is lost, so that there are disadvantages such as loss of information and lowering in its convenience.

Concretely, a hypertext is a group of linked (correlated) texts (electronized documents), and the basic concept is realization of multi-media software enabling the user to refer to each of texts multi-dimensionally correlated in a layered form through link structure in an arbitrary order. For this reason, the hypertext document contains, in addition to information visually provided to the user, information used for forming the link structure (namely, information as a hypertext). But once the hypertext document is outputted as a paper document, the information as the hypertext is lost, so that the outputted paper document is not any more a hypertext document.

It should be noted that, as a hypertext document can exist only as an electronized document in the conventional technology, the concept of hypertext itself has been used only in the digital world (virtual reality) in which electronized documents are treated. For this reason, there has not been a concept for realization of a hypertext by using a paper document, which is treated as a hypertext document, in the real world (this concept is defined and described as a paper hypertext hereinafter).

SUMMARY OF THE INVENTION

It is an object of the present invention to enable incorporation of a paper document in a document information management system in the digital world, direct access to the digital world using the paper document as a medium, and further to realize a hypertext using the paper document (paper hypertext) by realizing continuity and correlation of information between the digital world such as a computer system and a paper document.

The document information management system according to the present invention comprises a hypertext preparing unit for preparing a hypertext; a file unit for storing therein hypertexts prepared by the hypertext preparing unit and correlated information files correlated to each other through link structure of the hypertexts; a medium form information preparing unit for receiving the hypertext, preparing image extraction information by extracting only image data from information in the hypertext, preparing particular described information as well as linkage information for linking the described information to a correlated information file in the file unit from information having link structure such as a button, a switch, or an icon of information in the hypertext, and preparing medium form information by synthesizing the image extraction information, described information, and linkage information; a medium form output unit for printing the medium form information on recording paper and outputting the recording paper as a medium form; a selection information adding unit for adding selection information for selecting a desired described information from those printed on the medium form; a reader for reading the selection information and linkage information from the medium form with the selection information added via the selection information adding unit; a retrieving unit for retrieving an appropriate correlated information file from the file unit according to the selection information as well as linkage information read by the reader; and an output unit for outputting the correlated information file retrieved by the retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

Other objects and features of this invention will become understood from the following description with reference to the accompanying drawings.

BRIEF DESCRIPTION OF THE DRAWINGS

FIG. 7 is an explanatory view showing an example of described position information and address information each constituting linkage information (a linkage information table);

FIGS. 8A and 8B are explanatory views showing an example of described position information and description recognizing information each constituting linkage information (a linkage information table);

FIG. 9 is a flowchart schematically showing processing for preparing/registering the hypertext or medium form according to Embodiment 1;

FIG. 15 is an explanatory view showing an example of configuration of file unit specifying information according to Embodiment 3;

FIGS. 16A and 16B are explanatory views showing a method of using file unit specifying information according to Embodiment 3;

FIG. 25 is a system diagram showing a document information management system according to Embodiment 7 of the present invention;

DESCRIPTION OF THE PREFERRED EMBODIMENTS

Figure 1:
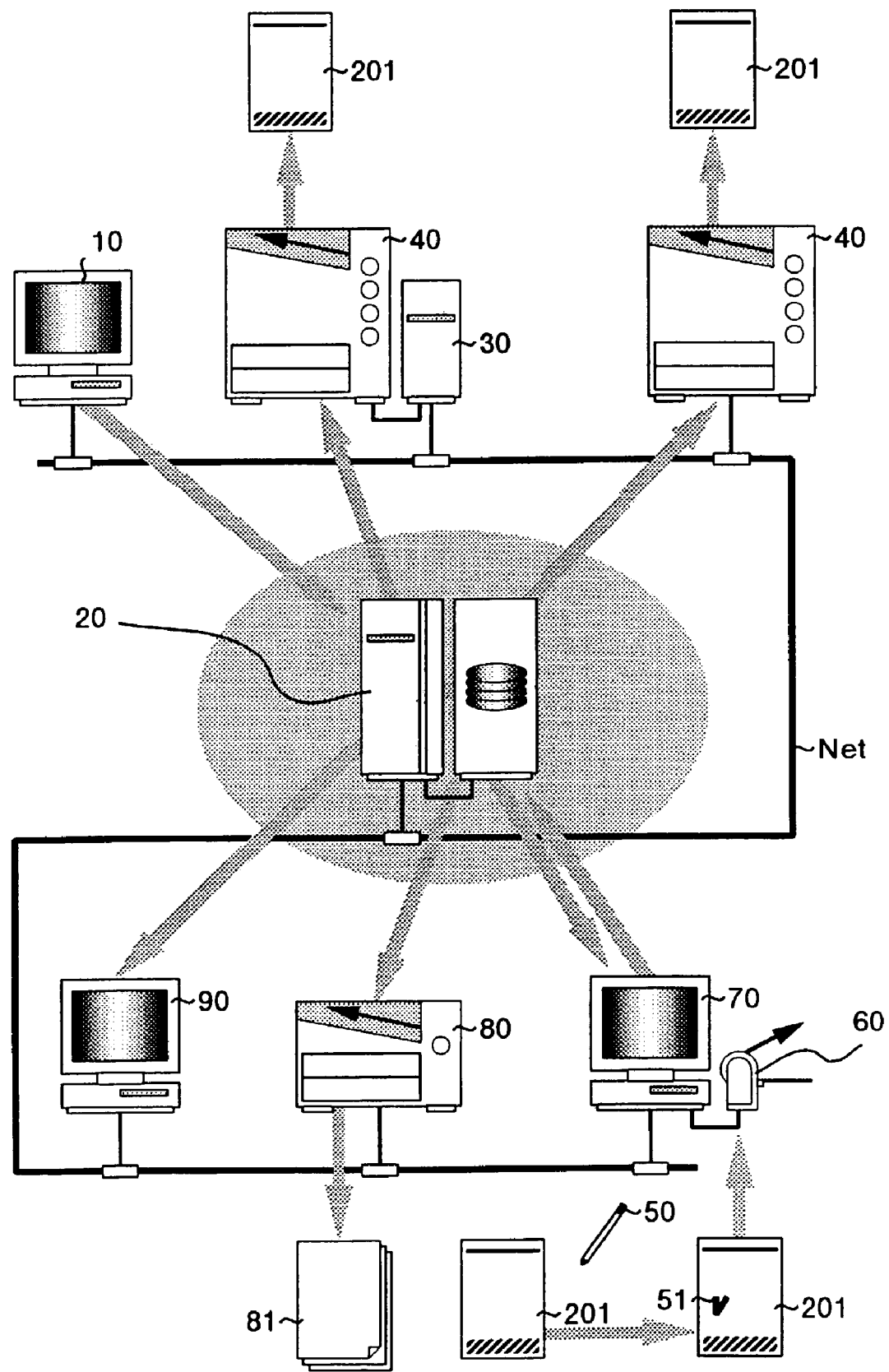
FIG. 1 is a system diagram showing a document information management system-according to Embodiment 1 of the present invention.

Detailed description is made hereinafter for the document information management system according to the present invention with reference to the attached drawings in the order of Embodiment 1 to Embodiment 7.

Detailed description is made hereinafter for a document information management system according to Embodiment 1 with reference to the attached drawings in the order of the following items.

(1) System configuration of the document information management system according to Embodiment 1
(2) Presentation of the concept of PUI
(3) Configuration of a medium form
(4) Roles of Dicons (described information)
(5) Concrete examples of selection information (6) Configuration of linkage information (7) Practical operations of the document information management system (7)-1 Processing for preparing/registering a hypertext or a medium form (7)-2 Processing for outputting a medium form (7)-3 Processing for retrieving/outputting correlated information.

(1) System Configuration of the Document Information Management System According to Embodiment 1

FIG. 1 shows a system diagram of the document information management system according to Embodiment 1, and the system comprises a network terminal 10 as a hypertext preparing unit for preparing a hypertext; a file server 20 as a retrieving unit for retrieving a file unit for storing therein a hypertext prepared by the network terminal 10 and a correlated information files correlated thereto by link structure of the hypertext as well as correlated information files; a printer server 30 as a medium form information preparing unit for receiving the hypertext, preparing image extraction information by extracting only image data from information concerning the hypertext, preparing particular described information as well as linkage information for linking the described information to a correlated information file in the file server 20 from information having link structure such as a button, a switch, or an icon of information concerning the hypertext, and preparing the medium form information by synthesizing the image extraction information, described information, and linkage information; a printer 40 as a medium form output unit for printing the medium form information on recording paper and outputting the recording paper as a medium form 201; a marker 50 as a selection information adding unit for adding a mark (selection information) 51 for selecting a desired described information from those printed on the medium form 201; a scanner 60 as a reader for reading the selection information and linkage information from the medium form 201 with the mark (selection information) 51 added by the marker 50; a network terminal equipment 70 as a retrieving unit for retrieving an appropriate correlated information file from the file server 20 according to the selection information as well as linkage information read by the scanner 60; a printer 80 as an output unit for outputting the correlated information file 81 retrieved by the network terminal equipment 70 on recording paper; and a network terminal equipment 90 as a display unit for displaying the output unit for outputting the correlated information file 81 retrieved by the network terminal equipment 70 on a display screen as well as the medium form information each on the screen.

It should be noted that each of the units is connected, as shown in the figure, directly or indirectly to a network Net. It is assumed herein that the Internet or Intranet or the like is used as the network Net, but it is not particularly restricted thereto.

The network terminal equipment (hypertext preparing unit) 10 comprises any existing personal computer or word processor and existing editor or word processor software, so the terminal equipment may be any device that can prepare information as a hypertext by describing information with a hypertext description language such as HTML. It should be noted that it is assumed herein that a prepared hypertext can be stored, by giving a function as a medium form information preparing unit to the network terminal equipment 10, in the file server 20 as it is, or that medium form information is prepared from the prepared hypertext and the medium form information can be stored in the file server 20 each according to selection by a user.

Any existing Web server can be used for the file server (file unit) 20. It should be noted that the file server 20 stores therein a document in a hypertext form and also stores medium form information as an image file. Any correlated information file referred to from a hypertext is also stored therein as a hypertext. Further, there is incorporated in the file server 20 retrieval software for a server (a portion of the retrieving unit) for retrieving any hypertext as well as correlated information file stored in the file server 20 according to a request from retrieval software for a client in the network terminal equipment (retrieving unit) 70 described later. It should be noted that, in order to simplify description, it is assumed herein that one unit of file server 20 is provided as a file unit, but the number of the file server 20 is not particularly restricted, and a plurality of file servers may be provided on the network Net.

The printer server (medium form information preparing unit) 30 comprises medium form information preparing software including two-dimensional bar code coding software and HTML source code developing software (e.g. a browser for the Internet/Intranet or the like). Although further details are described later, medium form information is prepared by developing HTML source code of a hypertext, generating a text section as image extraction information, encoding the HTML source code of the hypertext to two-dimensional bar code, generating a code area indicating described information and linkage information, and further synthesizing the text section and the code area.

Although a printer server is used herein as a medium form information preparing unit, it is not particularly restricted thereto, and it is needless to say that any device such as a personal computer/work station enabling execution of the medium form information preparing software may be employed. Also, a function as a medium form information preparing unit may be given to the file server 20 in place of discretely providing the printer server 30 as a medium form information preparing unit.

Any existing printer can be used for the printer (medium form output unit) 40, but it is desirable that a color printer is used to match levels of expression each other between a hypertext and a medium form 201. It may be said in this connection that blue is generally used on a display unit for a color of a button on a hypertext on the Internet/Intranet. When a document is stored in a hypertext form in the file server 20, the printer server (medium form information preparing unit) 30 prepares medium form information as image data, prints this medium form information on recording paper, and outputs the medium form 201.

Any existing scanner can be used for the scanner (reader) 60 and is generally used by being connected to an existing personal computer or the like for connection thereof to a network Net. As shown in FIG. 1, the scanner more efficiently works by being connected to the network terminal equipment (retrieving unit) 70. Also, any digital copying machine or the like may be used as a reader.

It should be noted that the scanner (reader) 60 reads, when a mark 51 is read by using a method of identifying any marking (a method of detecting a marked section using a difference from a reference image), a text section as raster information from the medium form 201 to which a mark 51 is added by a marker 50, and also reads a code area on the medium form 201 as raster information.

The network terminal equipment (retrieving unit) 70 comprises any existing personal computer or work station, and also has a correlated information identifying section for receiving selection information as well as linkage information read by the scanner 60 and identifying an appropriate correlated information file, and incorporates therein retrieval software for a client.

The correlated information identifying section comprises a two-dimensional bar code decoder, HTML source code developing software (e.g. any browser for the Internet/Intranet), and marking identifying software.

The retrieval software for a client identifies an appropriate file server 20 according to an address of the correlated information file identified by the correlated information identifying section, sends the address of the correlated information file, and controls the security according to a user ID and a password.

Any existing printer can be used for the printer (output unit) 80. However, when a correlated information file to be outputted is a document not including described information (namely, an ordinary document which is not a paper hypertext), any ordinary monochrome printer mat be used, but when a correlated information file to be outputted itself is a medium form 201 (namely, a paper hypertext), it is preferable to use a color printer as the printer (medium form output unit) 40.

The network terminal equipment (display unit) 90 is a display unit such as any existing personal computer or work station, and in general, the network terminal equipment (hypertext preparing unit) 10 or the display unit of the network terminal equipment (retrieving unit) 70 are used. In other words, the network terminal equipment 90 is not required to be provided as a discrete device, so that the network terminal equipments 70 and 90 can be shared, which is more efficient.

In description of the system diagram shown in FIG. 1, in order to make description clearer, it is assumed that the network terminal equipment 10 is used as a hypertext preparing unit, the network terminal equipment 70 is used as a retrieving unit, and the network terminal equipment 90 is used as a display unit, but any existing personal computers can be used for the network terminal equipments 10, 70, and 90 respectively, so that, in actual use, each of the network terminal equipments 10, 70, and 90 can be used, without being restricted to any particular role, as a hypertext preparing unit, retrieving unit, or display unit as required.

Further, system configuration in FIG. 1 shows a case where one or two devices are provided in correspondence to each unit according to the present invention, but the number of devices corresponding to each of the units is not particularly restricted, and a plurality of devices are supposed to be provided on the network Net in actual use if necessary.

(2) Presentation of the Concept of PUI

As clearly understood from description made below, the document information management system according to Embodiment 1 can realize continuity and relation of information between the digital world such as a computer system or the like (hypertexts and correlated information files in the file unit) and a paper document (a medium form 201), and the medium form 201 can be incorporated in the document information management system of the digital world, and also it is possible to directly access the digital world using the medium form 201 as a medium and furthermore to realize a paper hypertext using the medium form 201.

So, the document information management system according to the present invention is presented as PUI (Paper User Interaction) herein as a system for realizing Interaction (information transfer, an interactive interface) between a User (person) and a computer with Paper (medium form 201).

Further, a paper document is handled as a hypertext document, and a concept for realizing a hypertext using a paper document in the real world is defined as a paper hypertext. Accordingly, a medium form 201 used for the PUI indicates a hypertext document itself in the concept on the paper hypertext, and a Dicon in the medium form 201 indicates a switch printed on the paper (equivalent to a button or an icon in an ordinary hypertext).

(3) Configuration of the Medium Form

Detailed description is further made for the medium form 201 in the PUI. The medium form 201 is paper (form) on which are recorded Dicon as at least one described information comprising any of words, sentences, symbols, and graphics, linkage information for correlating the Dicon to a hypertext or a correlated information file in the file server (file unit) 20, selection information for selecting a particular Dicon in Dicons, and further document identifying information (described as Inper ID) for identifying the recorded document. However, described information, linkage information, and document identifying information are previously recorded on the medium form 201, but selection information is supposed to be recorded on the medium form 201 as a mark 51 by arbitrarily being written (marked) by a user using a marker (selection information adding unit) 50.

Figure 2:
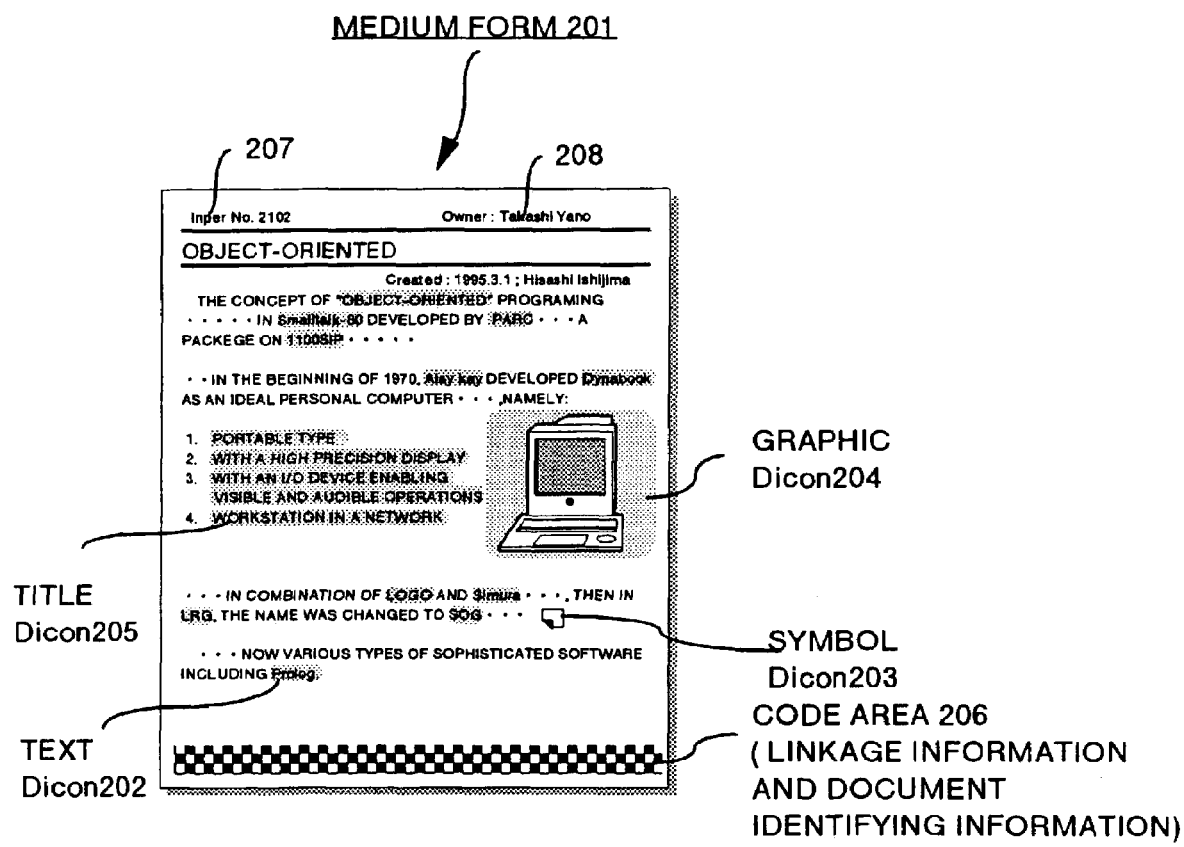
FIG. 2 is an explanatory view showing a medium form according to Embodiment 1.

FIG. 2 shows a concrete example of the medium form 201, and FIG. 2 shows the medium form 201 in a document form in which Dicons are arranged in the document as structural elements for an ordinary document. As shown in FIG. 2, words and texts are recorded on the medium form 201 in a document form as a text Dicon 202, an icon (symbol) indicating a document is recorded thereon as a symbol Dicon 203, a computer graphics are recorded thereon as a graphic Dicon 204, and words and a short text are recorded thereon as a title Dicon 205. Also linkage information and document identifying information are recorded in a code area 206 in an optically readable form like two-dimensional bar code. It should be noted that the reference numeral 207 indicates Inper ID shown with characters so that a user can identify contents of the document identifying information, and the reference numeral 208 indicates Owner ID shown with characters so that the user can identify an owner of the medium form 201. The Owner ID is also recorded on the code area 206 as owner information.

As described above, the medium form 201 in a document form is visually the same as an ordinary document outputted on recording paper. Accordingly, it is needless to say that the medium form 201 can be used as an ordinary document.

Accordingly, as clearly understood from the medium form 201, the medium form 201 in the present invention can be defined as a specific paper document which is readable by both a human (user) and a computer system (digital world).

(4) Roles of Dicons (Described Information)

Detailed description is made herein for roles of Dicons each recorded on the medium form 201.

Figure 3:
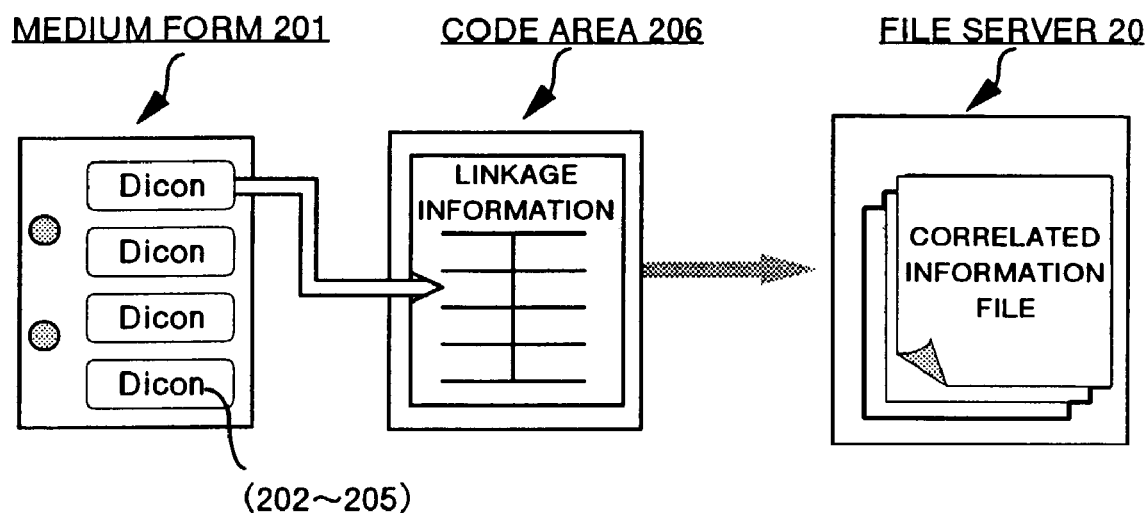
FIG. 3 is an explanatory view showing a linked relation between a Dicon (described information) and the correlated information file in a file unit.

As shown in FIG. 3, Dicons (202 to 205) recorded on the medium form 201 are linked (correlated) to the hypertext or the correlated information files in the file server (file unit) 20 through the linkage information in the code area 206. Accordingly, when a desired Dicon is selected among the plurality of Dicons recorded on the medium form 201, any hypertext or correlated information files linked to the selected Dicon can be identified. It should be noted that any ordinary document file or any file in a hypertext form (namely, a hypertext) may be used for a correlated information file. So, any case where description of "a correlated information file" is found indicate a file including a hypertext hereinafter.

Namely, each of the Dicons has a role as visual information recorded on the medium form 201, and also plays a role of a switch for selecting the correlated information file. In other words, conceptionally, Dicons are defined as ones playing roles as switches like buttons or icons on the hyper text.

Next description is made for types of Dicon. The Dicon comprises, as shown in FIG. 2, such four types of Dicon as a text Dicon 202, a symbol Dicon 203, a graphic Dicon 204, and a title Dicon 205, and each of the Dicons is defined as follows.

A text Dicon:
A Dicon written in forms of words and short sentences each used in a text in a hypertext form.

A symbol Dicon:
An icon-formed Dicon added to the end of a long sentence, or added to the entire contents of a medium form.

A graphic Dicon:
A Dicon in a form of rough illustrations and photographs each linking to detailed illustrations, photographs, and drawings (correlated information files).

A title Dicon:
A Dicon in which a title of correlated information file to which the appropriate Dicon is linked is written in a form of contents or a list or the like.

Figure 4:
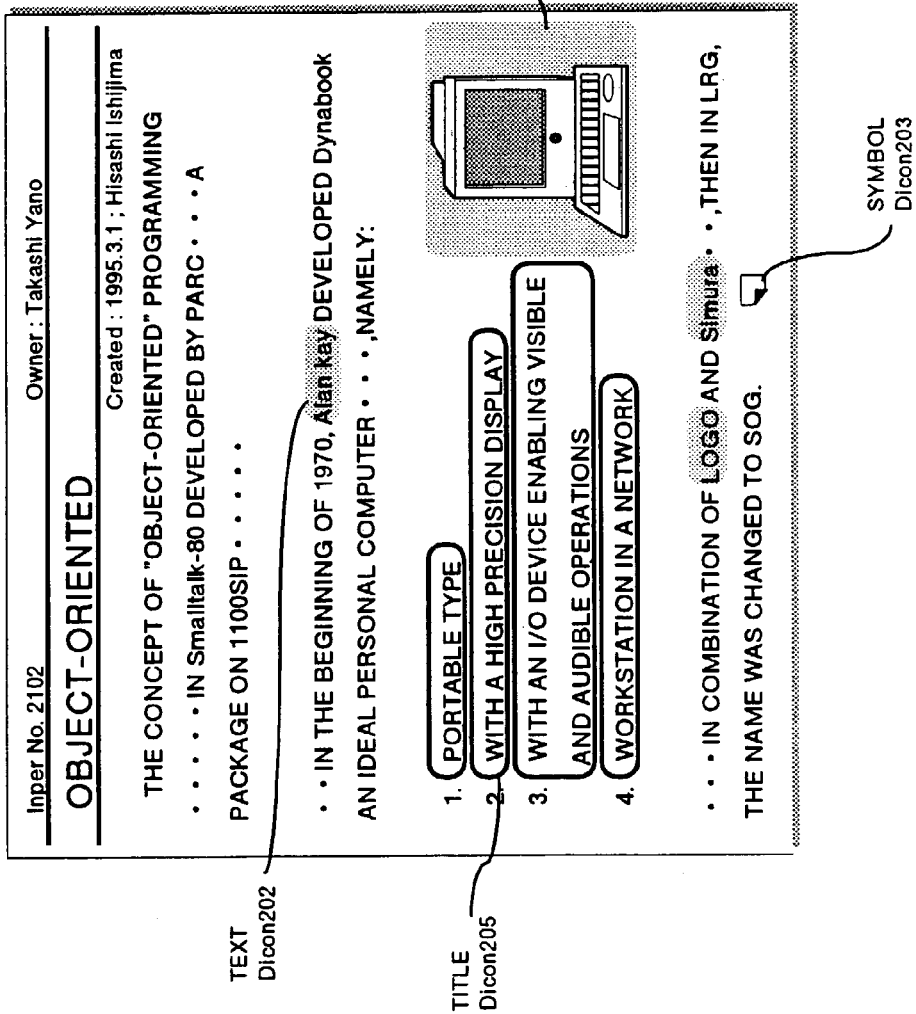
FIG. 4 is an explanatory view showing a method of describing Dicons.

FIG. 4 is an explanatory view showing a method of indicating Dicons. It is required to visually differentiate Dicons from information other than the Dicons so that a user can easily and accurately recognize the Dicons on the medium form 201. Accordingly, in the present invention, Dicons can be distinguished therefrom by being decorated or colored as described later. It should be noted that this decoration or coloring thereto is preferably the same as the decoration or coloring on the display screen of the hypertext which is an original for a medium form 201.

It should be noted that, as shown in the figure, a method of coloring the back ground, a method of changing fonts (e.g. a Ming-style type to a Gothic type or the like), a method of changing styles of type (e.g. a Italic type, a bold-face, addition of an underline or the like), a method of changing colors of characters (e.g. black to blue), and a method of enclosing a Dicon with a flame are applicable to decoration in the text Dicon 202.

As shown in the figure, a method of enclosing a Dicon with a frame and a method of coloring the back ground are also applicable to the decoration in the title Dicon 205 as well as in the graphic Dicon 204.

Decoration is not required for the symbol Dicon 203 because the Dicon itself is clearly identified as a Dicon. However, it is needless to say that decoration may be provided thereon.

(5) Concrete Example of Selection Information

Selection information is information for selecting a particular Dicon among the Dicons described on the medium form 201. In Embodiment 1, a mark 51 added (marked) to any Dicon by the marker (selection information adding unit) 50 as described above is used as selection information. It should be noted that any types of writing tool may be used for adding a mark (marking) to one of Dicons if the mark can be optically read by the scanner (reader) 60, and generally, a felt tip pen or the like may be used.

In this case, a high identification rate can be obtained by previously specifying a color of the marker 50 and using a color scanner as a scanner 60.

Figure 5:
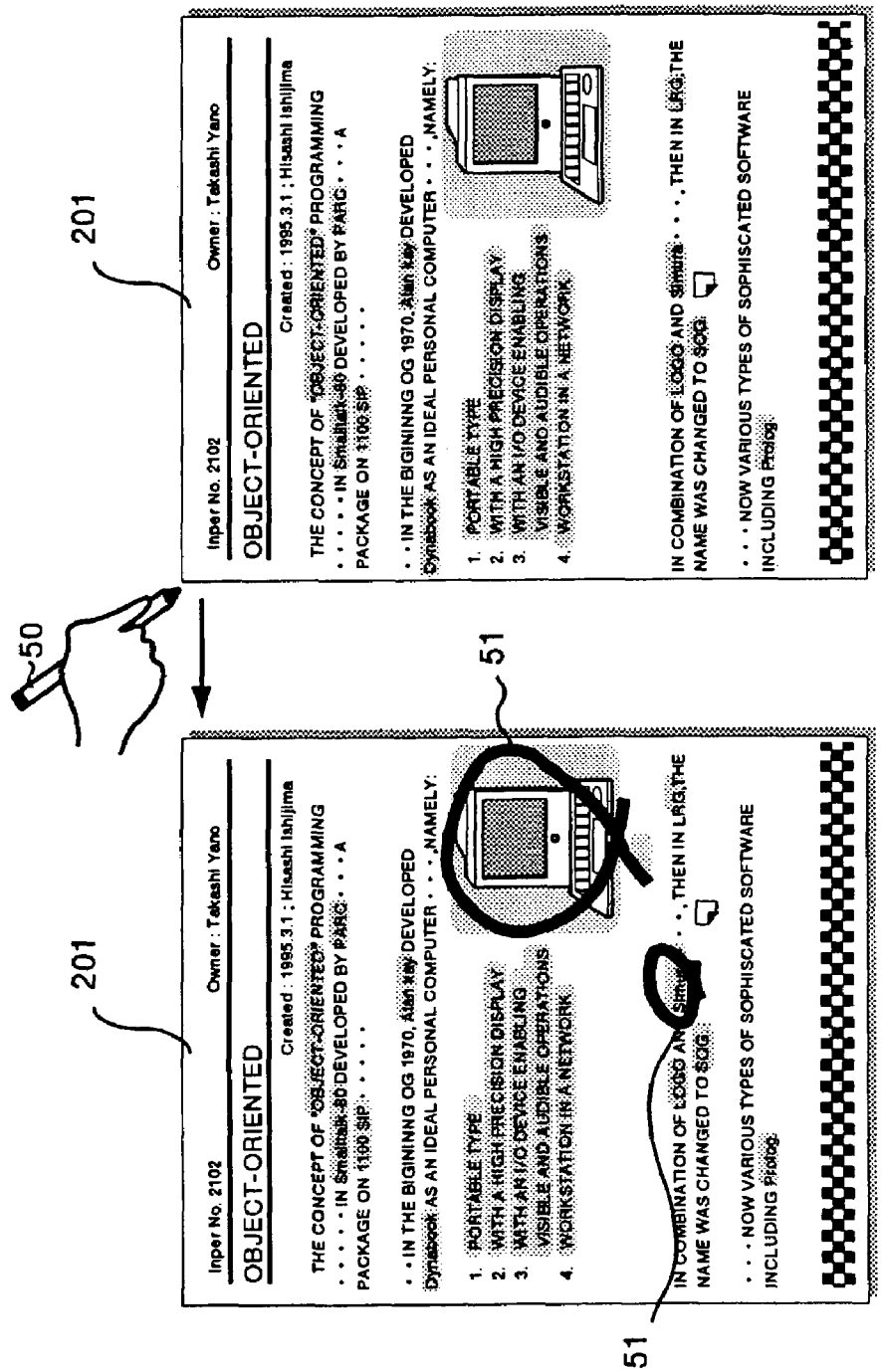
FIG. 5 is an explanatory view showing an example of adding (marking) a mark (selection information) to the medium form with a marker (selection information adding unit)

FIG. 5 shows an example of adding (marking) marks (selection information) 51 to some Dicons with the marker (selection information adding unit) 50.

(6) Configuration of Linkage Information

Linkage information is information described in a code area 206 as two-dimensional bar code as described above and for linking any Dicon to the correlated information file in the file server (file unit) 20.

Also linkage information comprises, for example, described position information for each of the Dicons on the medium form 201 and address information for correlating the described position information to the correlated information files, or comprises described position information for each of the Dicons on the medium form 201 and description recognizing information for identifying described information described at a position indicated by the described position information respectively.

Figure 6:
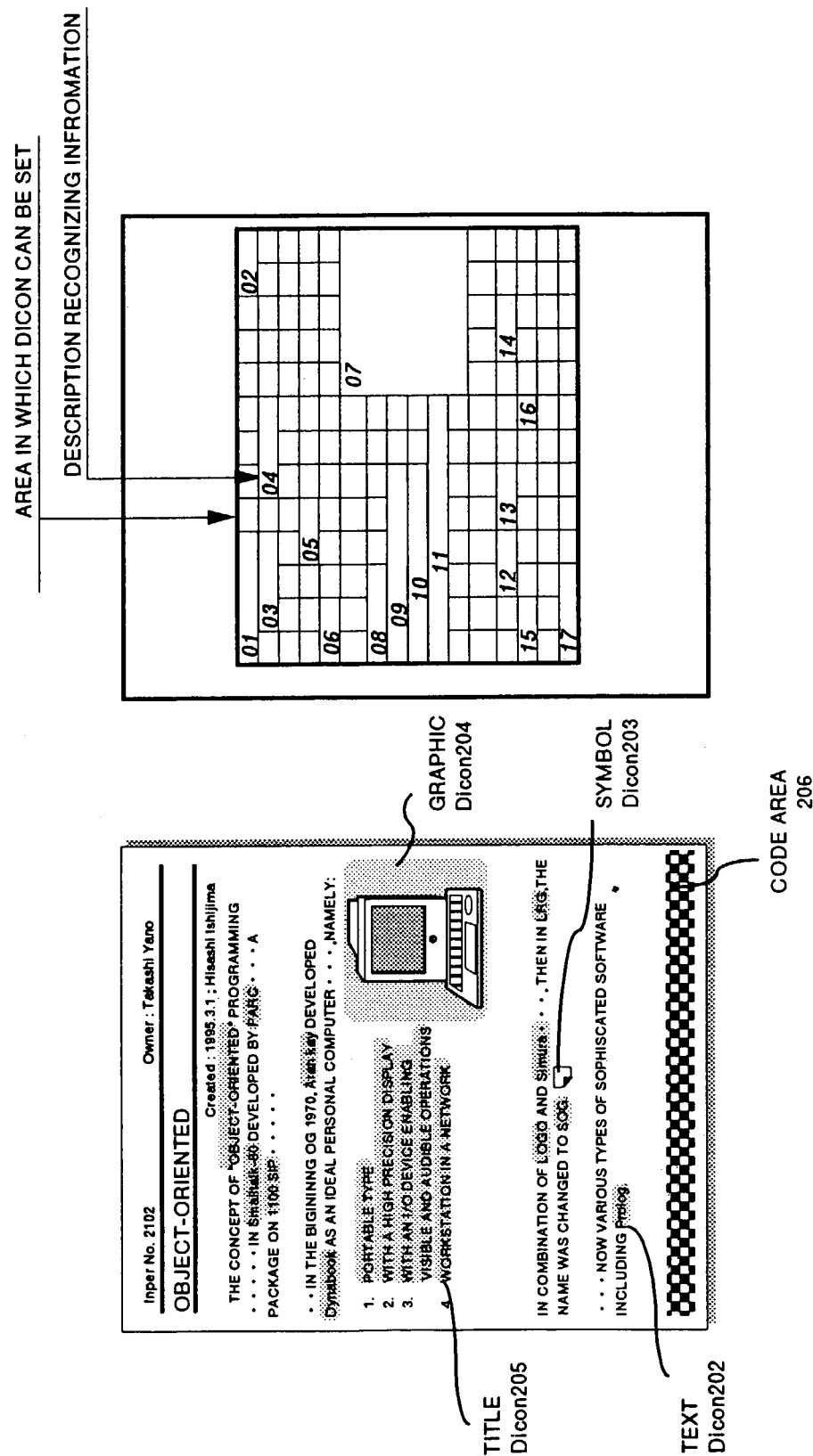
FIG. 6 is an explanatory view showing described position information which is a portion of linkage information.

Herein, description is made for the described position information which is a portion of linkage information with reference to FIG. 6. The described position information is information for specifying a position of each of Dicons on the medium form respectively, and may comprise, for instance, as shown in the figure, information comprising positions and areas of Dicons on a map and a Dicon number allocated to each of Dicons in the order of its appearance on the map using the map corresponding to coordinates of the medium form 201.

FIG. 7 shows an example in which this described position information and address information constitute linkage information (a, table of linkage information). As clearly understood from the table of linkage information, when any described position information is identified, an address of the corresponding correlated information file is identified. Namely, when any Dicon is selected with the selection information (mark 51) as shown in FIG. 5, a position of the coordinates on the map shown in FIG. 6 is identified from the position of coordinates of the selection information, and correlated information files corresponding to the Dicon can be retrieved according to the described position information (a Dicon Number) for the identified position of coordinates. For this reason, Dicon and the correlated information files can be linked to each other with the linkage information.

It should be noted that, as shown in the figure, it is assumed herein that address information is described with URL (uniform resource locator). By using URL as an address of each correlated information file as described above, for example, by connecting a plurality of file servers 20 located in any places to each other through the Internet, the system can be used without being aware of each of the file servers 20.

FIG. 8A shows an example in which described position information and description recognizing information constitute linkage information (a table of linkage information). Herein, description recognizing information is information for recognizing Dicons each described at a position indicated by each of described position information, and, for instance, by previously allocating a Dicon ID to each of Dicons, this Dicon ID can be used. As clearly understood from the table of linkage information, when the described position information is identified, the corresponding description recognizing information (Dicon ID) is identified. Namely, when any Dicon is selected with the selection information as shown in FIG. 5, a position of the coordinates on the map shown in FIG. 6 is specified from the position of the coordinates indicating the selection information, and the corresponding Dicon ID can be identified according to the described position information (a Dicon Number) indicating the identified position of coordinates.

In this case, by providing a conversion table to addresses (an intermediate address table) in the side of network terminal equipment (retrieving unit) 70 shown in FIG. 8B, corresponding correlated information file can be retrieved from a Dicon ID. In other words, a Dicon and the correlated information file can be linked with linkage information.

As clearly understood from the linkage information table shown in FIG. 7 and FIG. 8, in the linkage information (a linkage information table) in FIG. 7, described position information (in short, a Dicon) and address information (in short, a correlated information file) are linked one to one, and the linkage information table itself plays a role of a table of Dicon ID-address conversion, so that the table is suitable for a case where a Dicon is prepared on the medium form 201 and then the correlated information file is prepared. However, in this case, it is difficult to change the addresses of correlated information files after a medium form is prepared, so that linkage information shown in FIG. 7 is appropriate for a small-scale system.

On the other hand, in the linkage information (a linkage information table) shown in FIG. 8, described position information (in short, a Dicon) and description recognizing information (Dicon ID) are only linked one to one, and linkage of the description recognizing information to the correlated information file is executed with the table of Dicon ID-address conversion (an intermediate address table) provided in the side of the retrieving unit 70, so that, for instance, when description recognizing information is defined as general (common) information in an entire system, a Dicon and the correlated information file can be linked to each other only by setting one set of table of Dicon ID-address conversion in the side of the retrieving unit 70. Accordingly high extendibility and managing capability of the system can be achieved, and for this reason linkage information shown in FIG. 8 is appropriate for construction of a large-scale system.

Also, when described position information is defined as a specific information in each of medium forms, for example, a Dicon and the correlated information file can be linked to each other by setting a table of Dicon ID-address conversion for each of medium forms in the retrieving unit 70.

Furthermore, as shown in FIG. 6, a quantity of data for linkage information in a code area 206 can be reduced by specifying an area in which a Dicon can be set on the medium form 201 as required. Especially, it is effective when Dicons on the medium form are arranged in one side.

It should be noted that the linkage information described above (in FIG. 7 and FIG. 8) indicates the case where a Dicon finally corresponds to the correlated information file one to one (1:1), but the configuration is not limited to this one in the present invention, and it is needless to say that such cases as a correlation of one to plurality (1:n) and that of plurality to one (n:1) are included in the correlation between Dicons and the correlated information files.

(7) Concrete Operations of the Document Information Management System

In the configuration as described above, description is made for the operations of the system in the order of (7)-1 Processing for preparing/registering a hypertext or a medium form, (7)-2 Processing for outputting a hypertext or a medium form, and (7)-3 Processing for retrieving/outputting the correlated information. However, an example in Embodiment 1 assumes the case where a linkage information table (table of Dicon ID-address conversion) shown in FIG. 7 is used as a linkage information table.

(7)-1 Processing for Preparing/Registering a Hypertext or a Medium Form

FIG. 9 shows a general flow chart of the processing for preparing/registering a hypertext or a medium form according to Embodiment 1. At first, a document is described in a hypertext description language such as HTML and prepared as a hypertext using a network terminal equipment (hypertext preparing unit) 10 (S901). Then, selection is made as to whether the hypertext prepared on the network terminal equipment 10 is to be registered as a hypertext or as a medium form 201 (S902).

In step S902, when it is specified that the hypertext is to be registered as a hypertext, the network terminal equipment 10 transfers the prepared hypertext to the file server 20 via a network Net (S903). The file server stores, when having received a hypertext, the hypertext in the storing section 21 (a hard disk in the file server 20), sends the stored address (URL) to the network terminal equipment 10, and completes the registration (S904).

On the other hand, in step S902, when it is specified that the prepared hypertext is to be registered as a medium form 201, the network terminal equipment 10 prepares medium form information from the prepared hypertext (S905) by having the function as a medium form information preparing unit executed, and transfers the prepared medium form information (data for an image identical to the output image of the medium form 201) to the file server 20 (S906). To describe more specifically, at first, the network terminal equipment 10 develops HTML source code of the hypertext prepared in step S901 using HTML source code developing software, generates a text section which is image extraction information, then prepares described information and linkage information from the information having link structure such as a button, a switch, or an icon in the HTML source code of the hypertext using the two-dimensional bar code coding software, generates a code area 206 by encoding the described information and linkage information to two-dimensional bar code, and further prepares medium form information by synthesizing the text section and the code area 206.

The file server 20 stores, when having received medium form information, the medium form information in the storing section 21 (a hard disk in the file server 20), sends the stored address (URL) to the network terminal equipment 10, and completes the registration (S907).

As described above, in Embodiment 1, the prepared hypertext can be registered to the file server 20 as it is and also can be registered thereto as medium form information (data for an image identical to the output image of the medium form 201), so that a format to be registered can be selected as required. Accordingly, a medium form 201 can be outputted from the medium form information even when a device in the output side such as a printer or a display unit has no HTML source code developing software. For a hypertext required to be often outputted as a medium form 201, it is previously registered as medium form information, which allows the time required for executing the processing to be reduced with no necessity for the device in the output side to generate medium form information.

(7)-2 Processing for Outputting a Hypertext or a Medium Form

Figure 10:
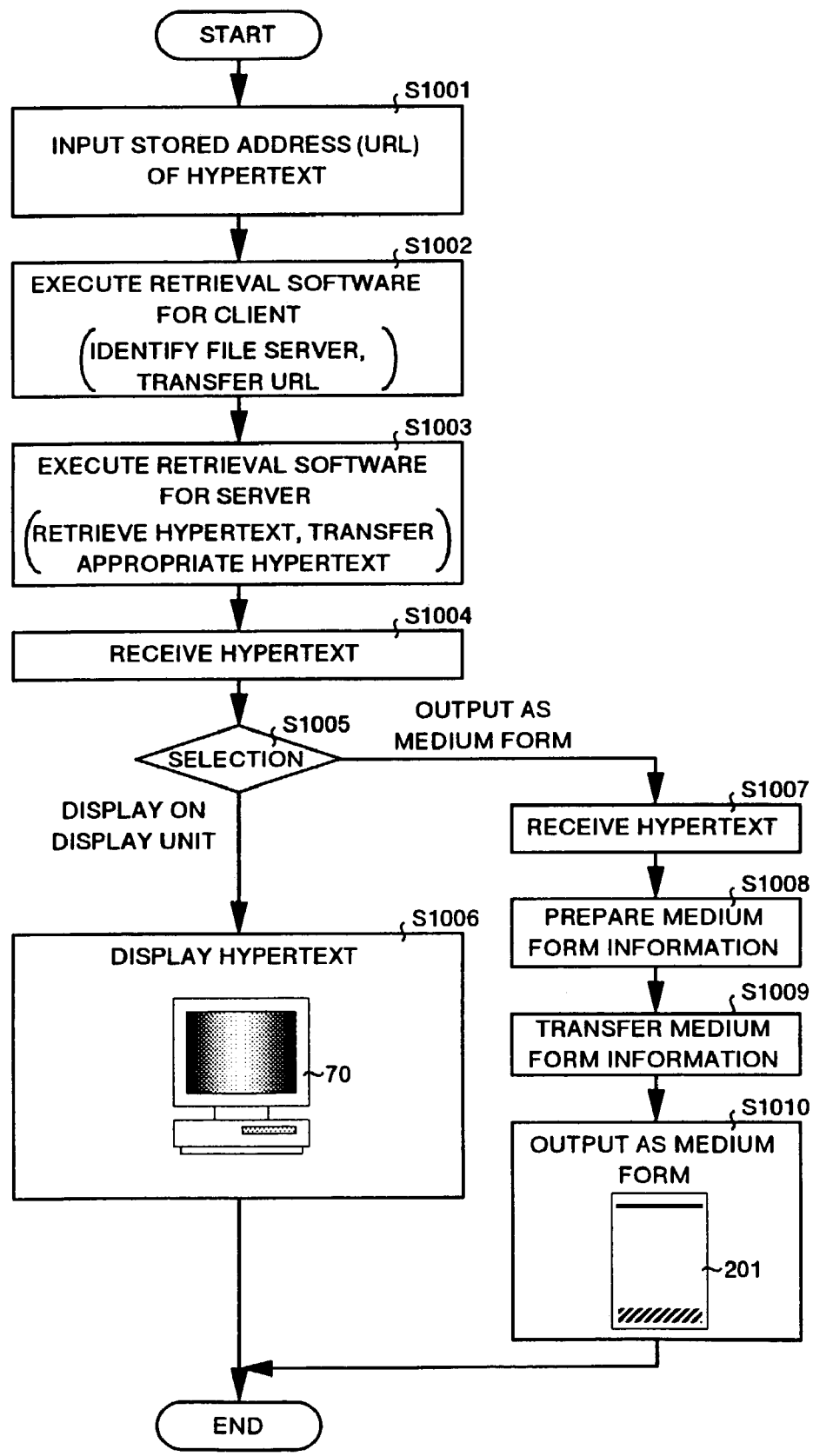
FIG. 10 is a flow chart schematically showing processing for outputting (displaying and printing) the hypertext or medium form according to Embodiment 1.
Figure 11:
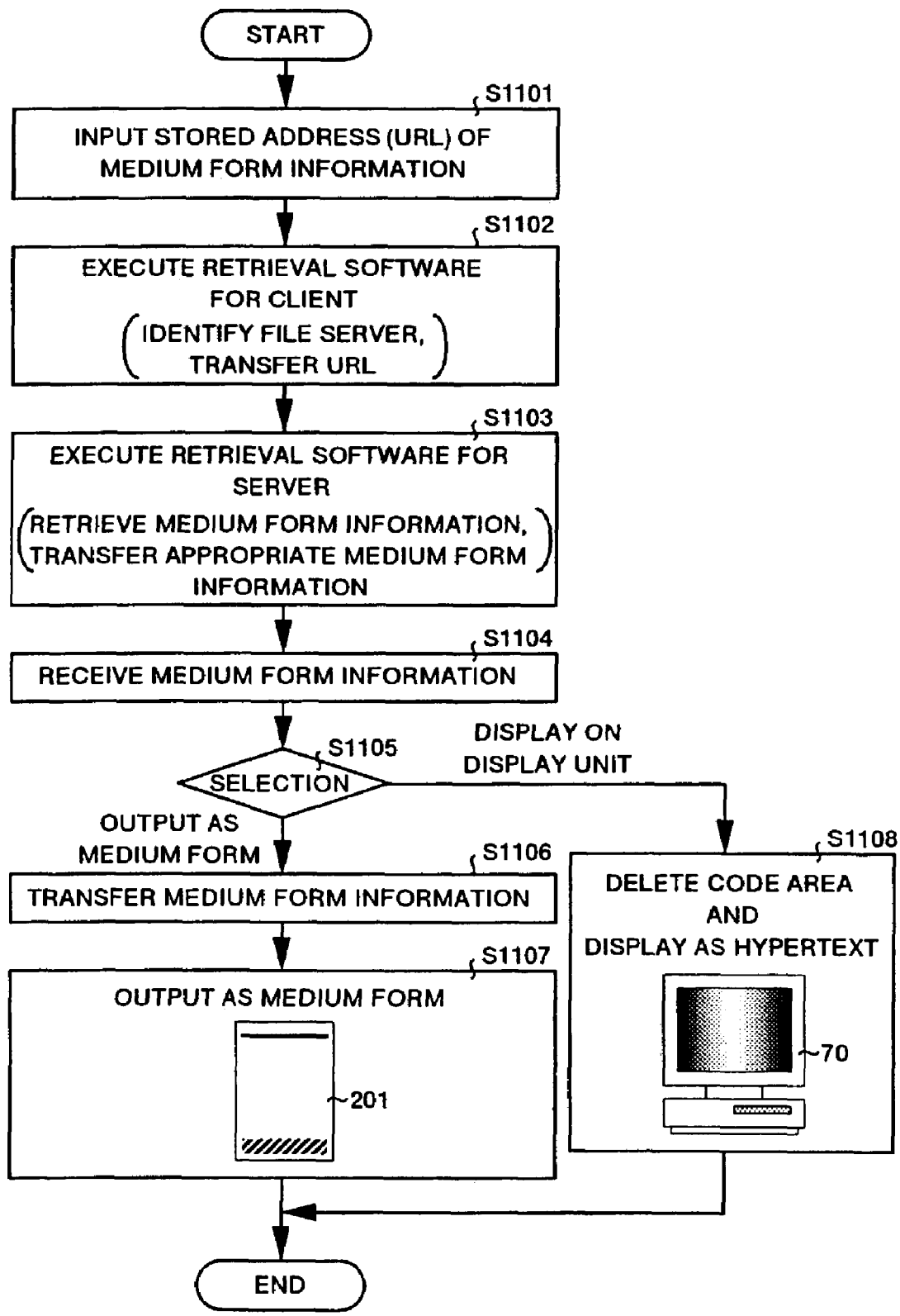
FIG. 11 is a flow chart schematically showing processing for outputting (displaying and printing) the medium form information according to Embodiment 1.

Next description is made for output processing for displaying or printing any hypertext or medium form information registered in the file server 20 with reference to the general flow charts shown in FIG. 10 and FIG. 11.

FIG. 10 shows a general flow chart of the processing for outputting a hypertext or a medium form (the processing for displaying and printing). When the processing for outputting a hypertext is to be executed, if a user inputs a stored address (URL) of a desired hypertext using a network terminal equipment (retrieving unit) 70 (S1001), the network terminal equipment (retrieving unit) 70 executes retrieval software for a client, identifies a file server 20 in which the hypertext is stored according to the stored address (URL) of the hypertext, and transfers the stored address (URL) to the file server 20 (S1002). By identifying the file server 20 using the stored address (URL) as described above, a desired file server 20 can accurately and easily be identified even when a plurality of file servers 20 exist on the network Net.

The file server (which functions herein as a retrieving unit) 20 executes, when having received a stored address (URL) of a hypertext, the retrieval software for a server, retrieves a hypertext according to the stored address (URL) of the hypertext, and transfers the appropriate hypertext to the network terminal equipment 70 (S1003).

The network terminal equipment 70 makes selection, when having received the appropriate hypertext (S1004), as to whether the received hypertext is to be displayed on a display unit or the hypertext is to be outputted as a medium form 201 according to specification by the user (S1005).

In step S1005, when it is specified that the received hypertext is to be displayed on a display unit, the network terminal equipment 70 displays the received hypertext on the display unit (S1006).

Also, in step S1005, when it is specified that the received hypertext is to be outputted as a medium form 201, the network terminal equipment 70 transfers the appropriate hypertext to the printer server (medium form information preparing unit) 30 (S1007).

The printer server (medium form information preparing unit) 30 first develops, when having received the hypertext, the HTML source code of the hypertext using the HTML source code developing software, then encodes the HTML source code of the hypertext to the two-dimensional bar code using the two-dimensional bar code coding software, prepares described information and linkage information from the information having link structure such as a button, a switch, an icon in the HTML source code of the hypertext, generates a code area 206 by encoding the described information and linkage information to the two-dimensional bar code, further prepares medium form information by synthesizing the text section and the code area 206 (S1008), and transfers the prepared medium form information to the printer (medium form output unit) 40 (S1009).

The printer (medium form output unit) 40 prints, when having received the medium form information (data for an image identical to the output image of the medium form 201), the medium form information on recording paper and outputs it as a medium form 201 (S1010).

In steps S1007 to S1010, there has been shown the example in which the hypertext is transferred to the printer server 30 and medium form information is prepared by the printer server 30, but, it is also possible, for example, to prepare medium form information in the side of the network terminal equipment 70, then directly transfer the medium form information to a printer 40, and output the medium form 201.

FIG. 11 shows a general flow chart of the processing for outputting medium form information (the processing for displaying and printing). When the processing for outputting the medium form information stored in the file server 20 is to be executed, if a user inputs a stored address (URL) of desired medium form information to a network terminal equipment (retrieving unit) 70 (S1101), the network terminal equipment (retrieving unit) 70 executes retrieval software for a client, identifies a file server 20 in which the medium form information is stored according to the stored address (URL) of the medium form information, and transfers the stored address (URL) to the file server 20 (S1102). By identifying the file server 20 using the stored address (URL) as described above, a desired file server 20 can accurately and easily be identified even when a plurality of file servers 20 exist on the network Net.

The file server (which functions herein as a retrieving unit) 20 executes, when having received a stored address (URL) of medium form information, the retrieval software for a server, retrieves medium form information according to the stored address (URL) of the medium form information, and transfers the appropriate medium form information to the network terminal equipment 70 (S1103).

The network terminal equipment 70 makes selection, when having received the appropriate medium form information (S1104), as to whether the received medium form information is to be displayed on a display unit or the medium form information is to be outputted as a medium form 201 according to specification by the user (S1105).

In step S1105, when it is selected that the information is to be outputted as a medium form 201, the network terminal equipment 70 transfers the appropriate medium form information to the printer 40 (S1106). The printer 40 prints, when having received the medium form information, the medium form information on recording paper and outputs it as a medium form 201 (S1107).

Also, in step S1105, when it is selected that the information is to be displayed on a display unit, the network terminal equipment 70 deletes the code area from the received medium form information, and displays it on the display unit as a hypertext (S1108).

(7)-3 Processing for Retrieving/Outputting Correlated Information

Next description is made for the processing for retrieving/outputting correlated information for retrieving correlated information (correlated information file) corresponding to the described information on a medium form 201 from the file server 20 using the medium form 201.

Figure 12:
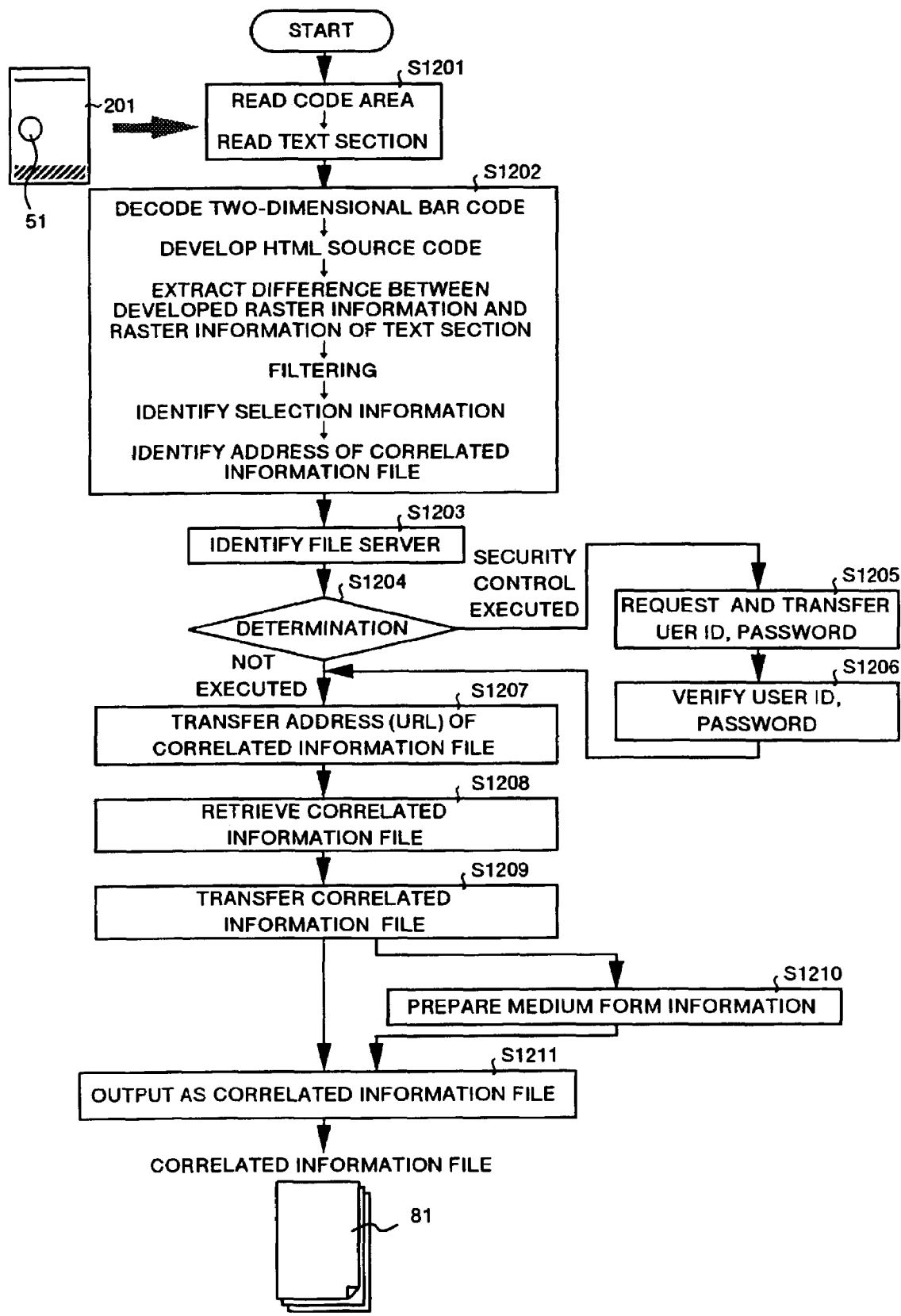
FIG. 12 is a flow chart schematically showing processing for retrieving/outputting correlated information using the medium form according to Embodiment 1.

FIG. 12 shows a general flow chart of the processing for retrieving/outputting correlated information using the medium form 201 according to Embodiment 1. At first, as shown in FIG. 5, a mark (selection information) 51 is previously added to desired described information (Dicon) on a medium form 201 using the marker (selection information adding unit) 50.

Then, the medium form 201 with the mark(s) 51 added thereto is read by the scanner (reader) 60 (S1201). In this case, the scanner 60 reads a code area 206 from the medium form 201 as raster information and also reads a text section with the mark(s) 51 added thereto. With those operations, linkage information and selection information are supposed to be read.

The network terminal equipment (retrieving unit) 70 decodes, when having received the code area 206 read by the scanner 60 as well as image data for the text section, the two-dimensional bar code of the code area 206 using the two-dimensional bar code decoder in the correlated information identifying section and obtains the HTML source code of the original hypertext and linkage information or the like, and then, develops the decoded HTML source code to raster information using the HTML source code developing software, extracts a difference between the developed raster information and the raster information in the read text section using the marking identifying software, obtains an image for the mark (selection information) 51 as well as a noise image (a slight displacement between the two raster information), further removes the noise image by filtering, and identifies the mark (selection information) 51. Then, the network terminal equipment 70 identifies described position information (Refer to FIG. 7 and FIG. 8) from the coordinate values of the mark 51, and identifies an address (URL) of the correlated information file from the corresponding address information (S1202).

Then, a file server 20 is identified using the retrieval software for a client according to the address (URL) of the correlated information file (S1203).

Then, determination is made as to whether security control has been set or not (S1204), the processing goes to step S1207 when it is determined that the security control has not been provided, and goes to step S1205 when it is determined that the security control has been provided.

In step S1205, the retrieval software for a client requests a user to enter the "user ID, password", and transfers the entered "user ID, password" and the Owner information previously described in the code area 206 to the file server 20. Then, in step S1206, the retrieval software for a server verifies the user ID and the password against the received "user ID, password" and the Owner information. Herein, when it is determined that the verification is made, the user is noticed that access to the retrieval software for a client in the network terminal equipment 70 has been permitted.

In step S1207, the retrieval software for a client transfers the address (URL) of the correlated information file to the file server 20.

The file server 20 retrieves, when having received the address (URL) of the correlated information file, an appropriate correlated information file (S1208), and transfers the retrieved correlated information file to the printer (output unit) 80 (S1209). However, when the correlated information file itself is a hypertext, as it is required to output the correlated information file as a medium form 201, medium form information is prepared in the printer server (medium form information preparing unit) 30 once (S1210), then the medium form information is transferred to the printer (output unit) 80 or to the printer (medium form output unit) 40.

The printer 80 or 40 outputs the received correlated information file (including the medium form information) on recording paper as a correlated information file 81 (S1211).

As described above, with the document information management system according to Embodiment 1, a medium form 201 is prepared from a hypertext, and continuity as well as correlation of information between the hypertext as a document in the digital world such as a computer, system and the medium form 201 as a paper document is constructed through the linkage information on the medium form 201, so that a paper document can be incorporated in the document information management system in the digital world, direct access to the digital world can be achieved by using the paper document as a medium, and further a hypertext using the paper document (paper hypertext) can be realized.

In a document information management system according to Embodiment 2 of the present invention, in the same system configuration as that of the document information management system according to Embodiment 1, linkage information (linkage information table) comprises described position information and description recognizing information as shown in FIG. 8A, and further a table of Dicon ID-address conversion (intermediate address table) for converting description recognizing information to an address of the correlated information file is provided, as shown in FIG. 8B, in the side of file server (file server as a retrieving unit) 20 or in the side of network terminal equipment (retrieving unit) 70.

By providing the table of Dicon ID-address conversion (intermediate address table) in the side of file server (retrieving unit) 20 or in the side of network terminal equipment (retrieving unit) 70 as described above, it is possible that such operations as deletion of any correlated information file, change of the contents thereof, or change of a link to other correlated information files can integrally be managed.

It should be noted that, in Embodiment 1, it is not clear to which medium form 201 an arbitrary correlated information file is linked unless a user checks all linkage information on the medium form 201. Accordingly, in order to delete the correlated information file, change the contents, and change the link or the like, necessary steps has to be taken for all of the outputted medium forms 201 considering the effects thereof.

In contrast, in Embodiment 2, as addresses of correlated information files are managed on the intermediate address table, it is possible to integrally manage the addresses only by rewriting addresses of the correlated information files on the intermediate address table even when such operations as deletion of any correlated information file, change of the contents thereof, or change of the link are performed. For example, when information in a correlated information file A is to be updated, because of being old, to information in a new correlated information file B, only the intermediate address table in the file server (retrieving unit) 20 or in the network terminal equipment (retrieving unit) 70 may be rewritten.

Figure 13:
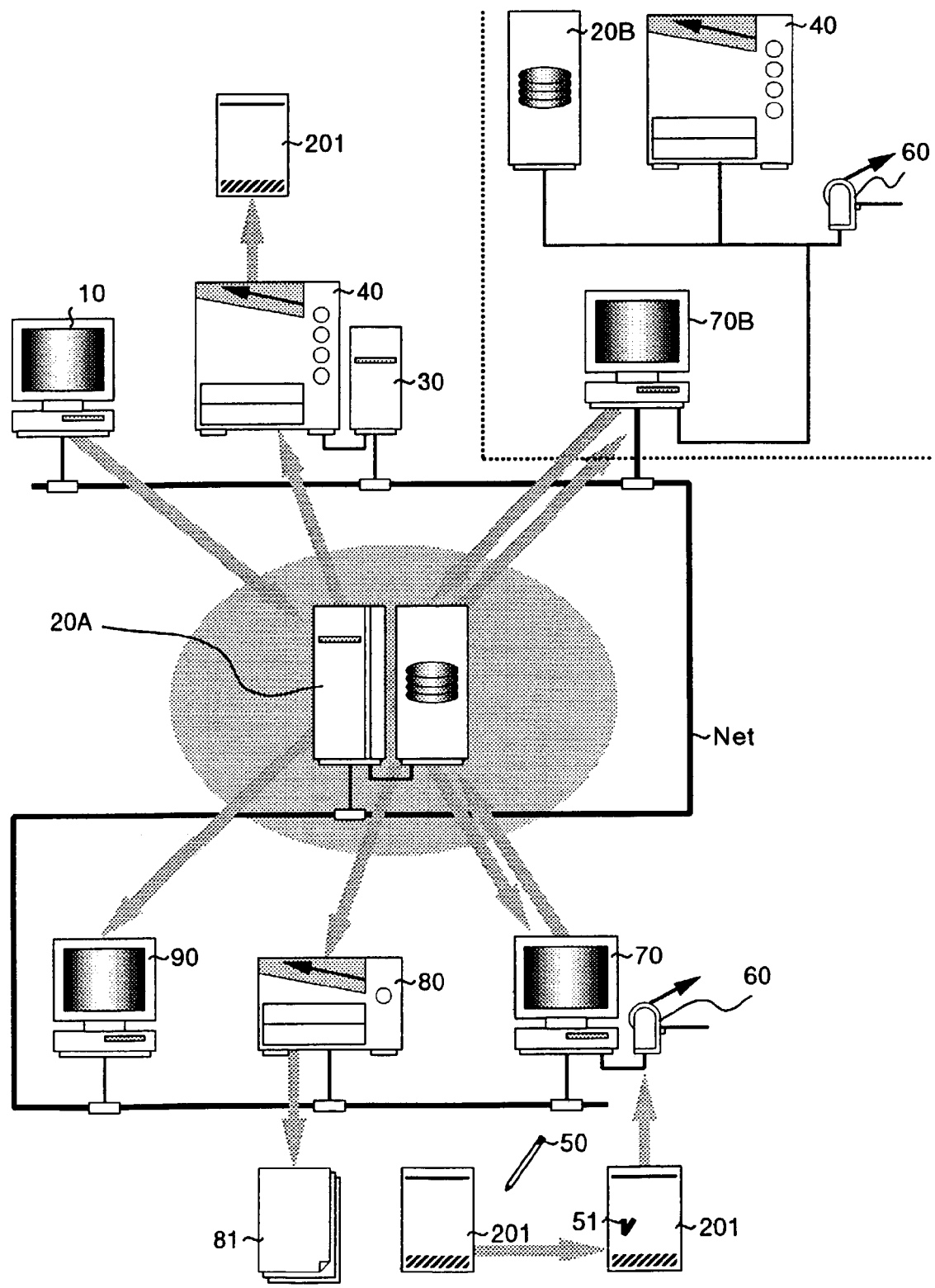
FIG. 13 is a system diagram showing a document information management system according to Embodiment 3 of the present invention.

FIG. 13 is a system diagram showing a document information management system according to Embodiment 3 of the present invention. In the document information management system according to Embodiment 3, a plurality of file units are provided therein and file unit specifying information for specifying a file unit with an appropriate hypertext stored therein from the plurality of file units is described in the code area on a medium form. It should be noted that, as the basic system configuration is the same as that according to Embodiment 1, the same reference numerals are allocated to those corresponding to the same devices, so that only the sections different therefrom are explained in detailed herein.

In FIG. 13, the reference numeral 20A indicates a file server (a portion of a file unit and a retrieving unit) and stores therein a hypertext and the correlated information files correlated thereto through link structure of the hypertext. It should be noted that the information stored in this file server 20A is supposed to be basically available by all users on the network Net. Accordingly, there are stored files for shared information in this file server 20.

The reference numeral 70B indicates a network terminal equipment (retrieving unit) and, as shown in the figure, the scanner 60, printer 40, and a file device 20B described below are connected to the terminal equipment, and a personal computer system is constructed with those devices.

The reference numeral 20B indicates a file device for storing therein hypertexts and correlated information files, which is connected, as shown in the figure, to a network Net via the network terminal equipment 70B. Accordingly, the same function as that in the file server 20A is performed by this file device 20B as well as some of the functions in the network terminal equipment 70B.

In Embodiment 3, the processing for preparing medium form information in the printer server (medium form information preparing unit) 30 and the network terminal equipment 70 comprises the steps of receiving a hypertext; preparing image extraction information by extracting only image data from the information concerning the hypertext; preparing particular described information as well as linkage information for linking the described information to a correlated information file in a particular file unit among the plurality of file units from the information having link structure such as a button, a switch, or an icon among the information on the hypertext; further preparing file unit specifying information for specifying a file unit in which the appropriate hypertext is stored from the plurality of file units; and preparing the medium form information by synthesizing the image extraction information, described information, linkage information, and file unit specifying information.

Figure 14:
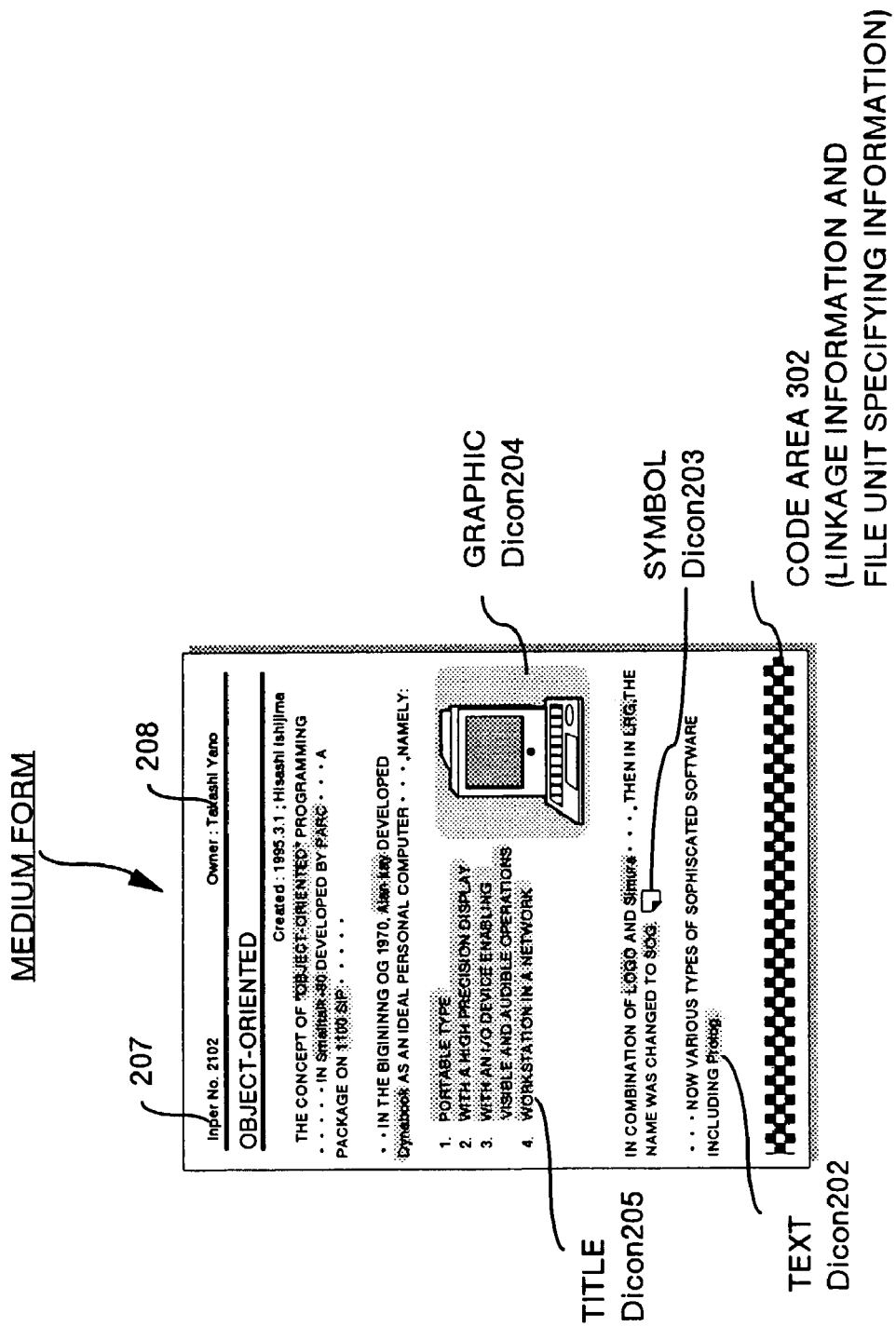
FIG. 14 is an explanatory view showing a medium form according to Embodiment 3.

FIG. 14 is an explanatory view showing a medium form 301 according to Embodiment 3. The structure of the medium form 301 is basically the same as that of the medium form 201 according to Embodiment 1, but file unit specifying information is described in a code area 302 in addition to the linkage information. This file unit specifying information comprises, as shown in FIG. 15, file unit identifying information for identifying a file unit (a file server 20A or a file device 20B or the like) in which the hypertext is stored, hypertext identifying information for identifying the original hypertext used to prepare the medium form 301, and version information for identifying a version of the original hypertext.

As linkage information in Embodiment 3, any linkage information (linkage information table) comprising the described position information and description recognizing information shown in FIG. 8A is used. Accordingly it is assumed that the table of Dicon ID-address conversion (intermediate address table) shown in FIG. 8B is provided in the file server 20A and network terminal equipment 70B.

In the configuration described above, detailed description is made for the operations specific to Embodiment 3 in the order of (1) Method of using file unit specifying information, (2) Processing for retrieving/outputting correlated information, (3) Processing for managing a version, and (4) Processing for retrieving/outputting correlated information and a medium form.

(1) Method of Using File Unit Specifying Information

As the file unit specifying information includes, as shown in FIG. 15, the file unit identifying information, hypertext identifying information, and version information, any file unit (a file server 20A or a file device 20B or the like) in which the original hypertext used to prepare the medium form 301 is stored can be identified by referring to file unit identifying information (address of the device) in the file unit specifying information.

Accordingly, when a plurality of file units each controlled under a plurality of different file systems exist, for example, when there are a file unit like the file server 20A existing as a file system having shared information and a file unit like the file device 20B existing as a local and personal file system, each of the file units can be used discretely from each other.

Because each of the file units can be separated from others and used discretely, a different format for each file unit can be employed for a structure of each linkage information for linking a medium form 301 (or a hypertext) to a correlated information file. In other words, a plurality of document information management systems each operating with linkage information in a different format can be constructed (or coexist) using the hard configuration of the same document information management system.

Description is made herein for a concrete method of using file unit specifying information with reference to FIG. 16A and FIG. 16B. At first, each of the network terminal equipments (retrieving unit) 70 and 70B identifies an address of the device with reference to file unit identifying information (address of the device) in the file unit specifying information. For example, when the device address indicates a device address of the file server 20A storing therein a file with information shared in the whole system, as shown in FIG. 16A, the file server 20A is identified from the file unit specifying information, then description recognizing information (Dicon ID) is identified from the selection information and the linkage information table, and the description recognizing information (Dicon ID) is transferred to the file server 20A.

The file server 20A identifies address information (address of the correlated information file) corresponding to the received description recognizing information (Dicon ID) by referring to the table of Dicon ID-address conversion. (intermediate address table). It is assumed herein that the address information for the table of Dicon ID-address conversion in the side of this file server 20A is described with URL.

On the other hand, when the device address indicates a device address of the file device 20B storing therein a local and personal file, as shown in FIG. 16B, the file device 20B is identified from the file unit specifying information, then description recognizing information (Dicon ID) is identified from the selection information and the linkage information table, and the description recognizing information (Dicon ID) is transferred to the side of the file device 20B (concretely to the network terminal equipment 70B).

The file device 20B identifies address information (address of the correlated information file) corresponding to the received description recognizing information (Dicon ID) using the table of Dicon ID-address conversion (intermediate address table). It is assumed therein that the address information for the table of Dicon ID-address conversion in the side of this file device 20B is described in file addresses of the file device 20B.

As clearly understood from the above description, linkage information (the linkage information table and table of Dicon ID-address conversion) can freely be set for each file unit (the file server 20A or file device 20B or the like). In other words, a user can freely prepare a medium form 301 using any local file or any local file system and distribute the medium form 301 to other persons other than the file or file system having shared information. As the description recognizing information (Dicon ID) itself can also freely be set by each file unit, even the same description recognizing information (Dicon ID), as shown in FIG. 16A and FIG. 16B, can resultantly be correlated to a different correlated information file.

The essential meaning of providing the method of using the document information management system as described above is that the method can easily support the system even when the system becomes larger in its scale on the whole. Also, when there are a plurality of administrators or management firms for the document information management systems, the plurality of systems can coexist with each other while consistency through the whole systems is maintained. Further no restriction is given to each of the systems when it operates.

It should be noted that identification of any file unit (file server 20A or file device 20B or the like) according to file unit identifying information (device address) in file unit specifying information indicates the same meaning as identification of any system to which each file unit belongs.

(2) Processing for Retrieving/Outputting Correlated Information

Figure 17:
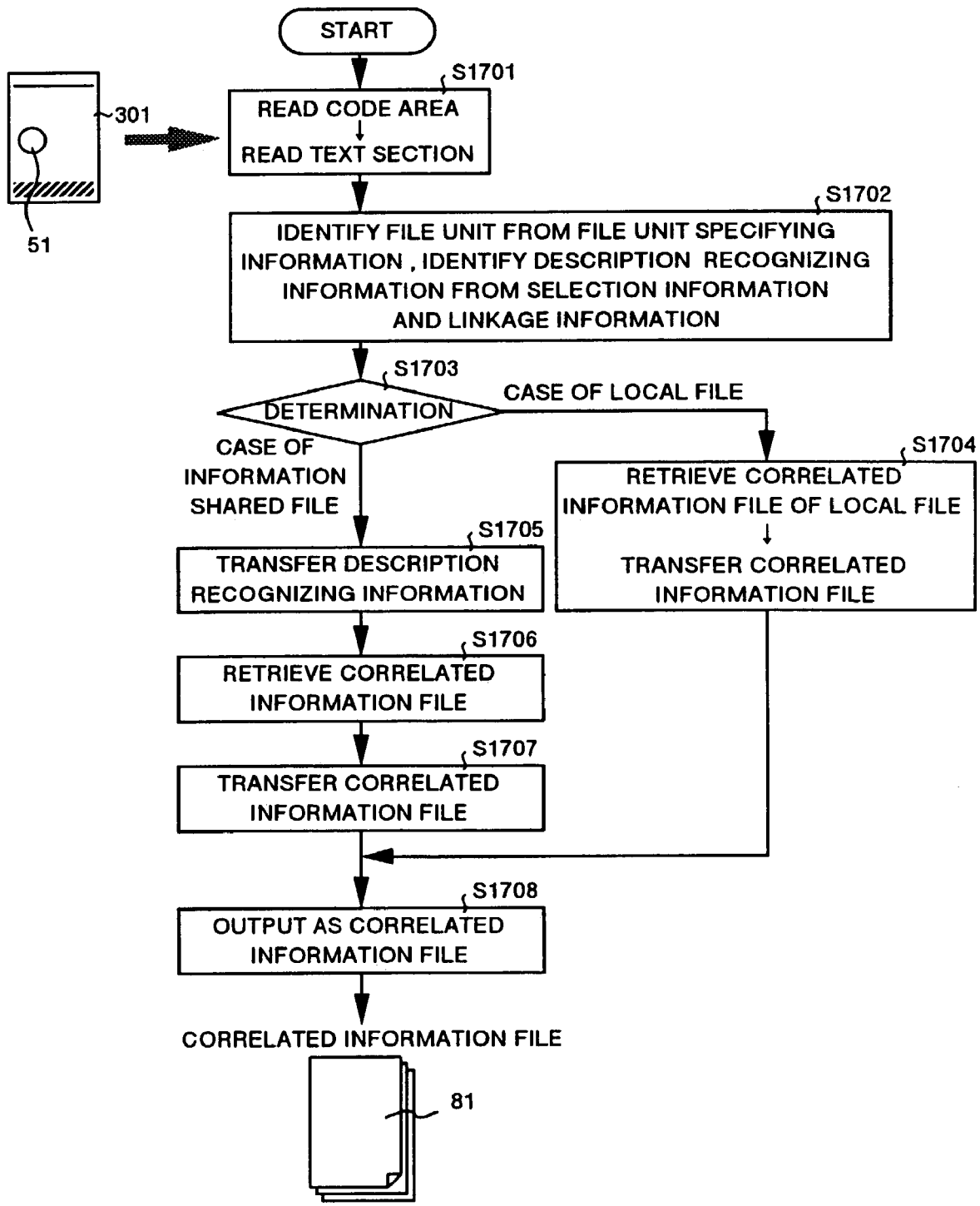
FIG. 17 is a flow chart schematically showing processing for retrieving/outputting correlated information using the medium form according to Embodiment 3.

FIG. 17 shows a general flow chart of the processing for retrieving/outputting correlated information using the medium form 301 according to Embodiment 3. At first, as shown in FIG. 5, a mark (selection information) 51 is previously added to desired described information (Dicon) on a medium form 301 using the marker (selection information adding unit) 50.

Then, the medium form 301 with the mark(s) 51 added thereto is read by the scanner (reader) 60 (S1701). In this step, the scanner 60 reads a code area 302 from the medium form 301 as raster information and also reads a text section with the mark(s) 51 added thereto.

The network terminal equipment (retrieving unit) 70B fetches linkage information (linkage information table), file unit specifying information, and selection information from the code area 302 and the image data for the text section each read by the scanner 60 using the retrieval software for a client, identifies a file unit (a file server 20A or a file device 20B or the like) from the file unit specifying information, and identifies description recognizing information (Dicon ID) from the selection information as well as the linkage information (linkage information table) (S1702).

Then, determination is made as to whether the file is a local file or an information shared file according to the identified file unit (the file server 20A or file device 20B or the like) (S1703), the processing goes to step S1704 when it is determined that the file is a local file, and goes to step S1705 when it is determined that the file is an information shared file.

In the case of the local file, in other words, when the file device 20B is identified as a file unit, the network terminal equipment 70B converts description recognizing information (Dicon ID) to address information (an file address in the file device 20B) using the table of Dicon ID-address conversion stored therein, retrieves any appropriate correlated information file, transfers the retrieved correlated information file to the printer 40 connected to the local file (S1704), and the processing goes to step S1708.

It should be noted that, when the network terminal equipment 70 is used as a retrieving unit, the network terminal equipment 70 transfers the file unit specifying information and description recognizing information (Dicon ID) to the network terminal equipment 70B in step S1704, and then, the network terminal equipment 70B retrieves any correlated information file, transfers the retrieved correlated information file to the network terminal equipment 70, further transfers the file to a specified printer 40 via the network terminal equipment 70, and the processing goes to step S1708.

On the other hand, in the case of the information shared file, in other words, when the file server 20A is identified as a file unit, the network terminal equipment 70B transfers description recognizing information (Dicon ID) to the file server 20A (S1705).

The file server 20A converts, when having received the description recognizing information (Dicon ID), the description recognizing information (Dicon ID) to address information (URL in the correlated information file) using the table of Dicon ID-address conversion stored therein, retrieves any appropriate correlated information file (S1706), and transfers the retrieved correlated information file to a specified printer 80 or 40 (S1707). It should be noted that it is assumed herein that, when it is found that a correlated information file exists on any other file unit on the network Net according to the address information (URL in the correlated information file), although detailed description thereof is omitted herein, the file server 20A acquires correlated information file from the appropriate file unit according to the URL in the correlated information file or sends the device address of the printer 80 or 40 as a destination for transferring with an instruction to transfer the file back to the printer.

The printer 80 or 40 outputs the received correlated information file on recording paper as a correlated information file 81 (S1708)

(3) Processing for Managing a Version

Figure 18:
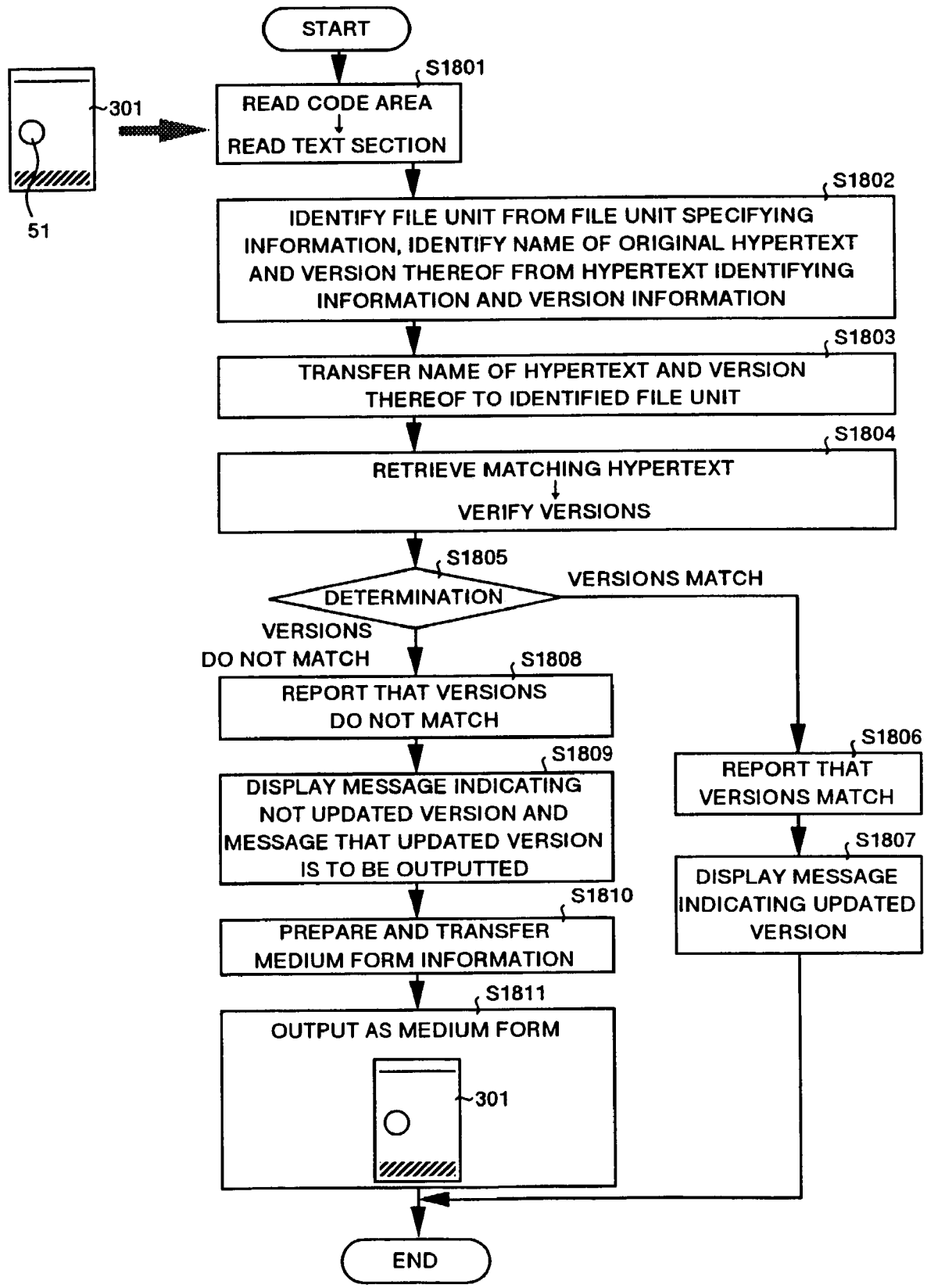
FIG. 18 is a flow chart schematically showing processing for managing versions according to Embodiment 3.

Next description is made for the processing for managing a version using the hypertext identifying information and version information included in the file unit specifying information with reference to FIG. 18. It should be noted that description assumes a case where the processing for managing a version of a medium form 301 is performed by the network terminal equipment 70 as an example to simplify the description.

At first, a medium form 301 is read by the scanner (reader) 60 (S1801). In this case, the scanner 60 reads a code area 302 and a text section from the medium form 301 as raster information.

The network terminal equipment (retrieving unit) 70 fetches file unit specifying information from the code area 302 read by the scanner 60 using the retrieval software for a client, identifies a file unit (a file server. 20A or a file device 20B or the like) from the file unit specifying information, and also identifies a name of the original hypertext used to prepare the medium form 301 as well as a version of the hypertext according to the hypertext identifying information and the version information (S1802).

Then, the name of the hypertext and the version thereof are transferred to the identified file unit (e.g. the file server 20A) (S1803).

The file server 20A retrieves, when having received the name of the hypertext and the version thereof, a name of any hypertext matching one among the hypertexts stored therein, and makes verification between the version of the retrieved hypertext and the received version (S1804).

Then, determination is made as to whether the versions match each other or not as a result of verification between the versions (S1805), and when it is determined that the versions match, the file server 20A sends a message that the version of the read medium form 301 is an updated version to the network terminal equipment 70 (S1806), and the network terminal equipment 70 displays the message on the screen thereof (S1807).

On the other hand, when it is determined that the versions do not match, the file server 20A sends a message that the version of the read medium form 301 is not an updated version to the network terminal equipment 70 (S1808), and the network terminal equipment 70 displays the above message as well as a message that a medium form 301 in the updated version is to be outputted on the screen thereof (S1809), prepares medium form information from the hypertext in an appropriate updated version, and transfers the medium form information to a specified printer 80 or 40 (S1810).

The printer 80 or 40 outputs the received medium form information on recording paper as a medium form 301 (S1811).

As described above, in Embodiment 3, versions of the medium form 301 can be managed by including hypertext identifying information and version information in the file unit specifying information. When the version of a medium form 301 does not match the version stored therein (not updated), the network terminal equipment can let the user know the warning that the version has already been updated by displaying it on the screen. Also, when the version of the medium form 301 does not match the version stored therein, medium form information (namely a medium form 301) in the updated version is outputted, so the user can use a medium form 301 in the updated version at any time even if the version of the medium form 301 that the user owns is old.

Figure 19:
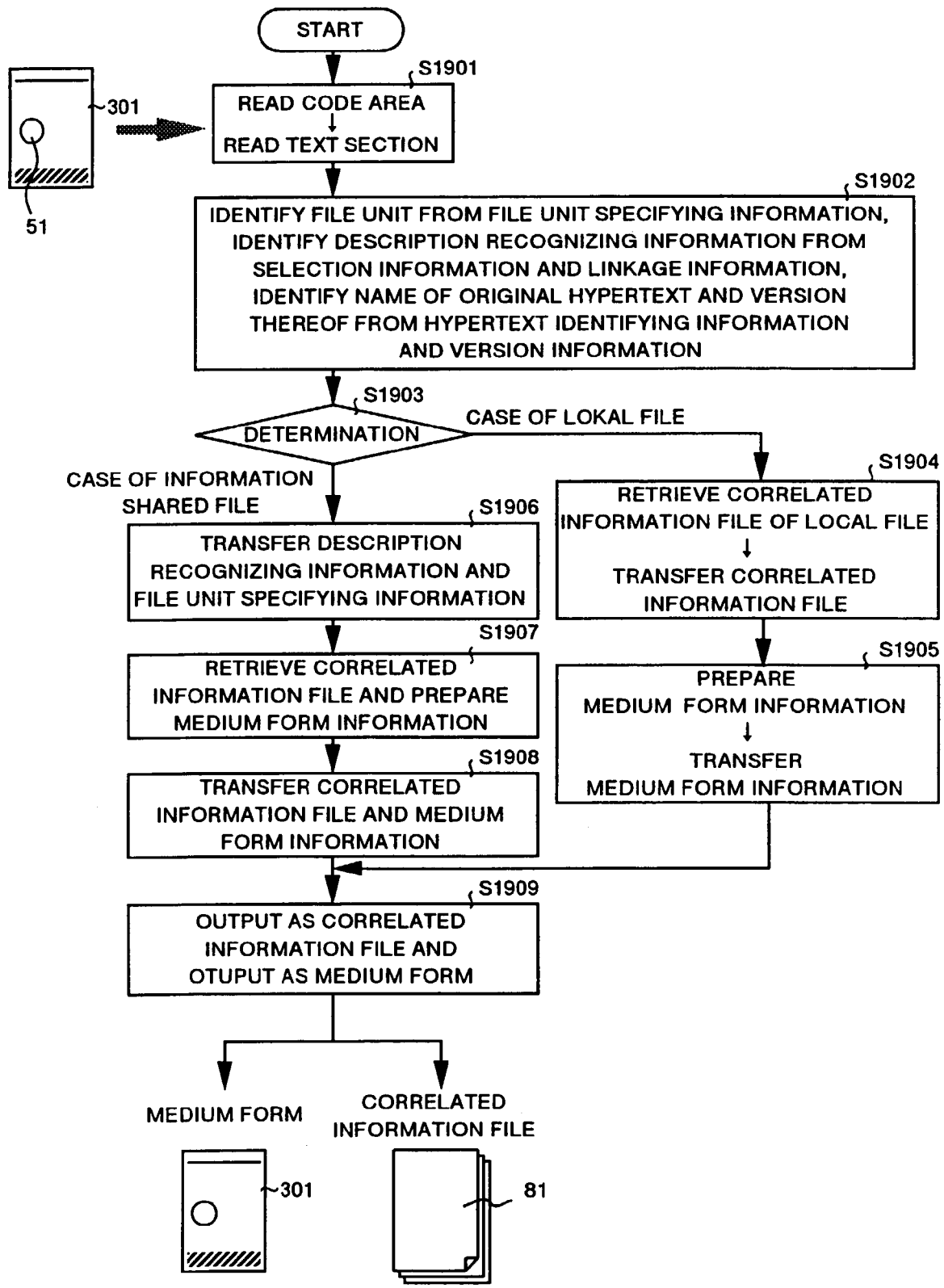
FIG. 19 is a flow chart schematically showing processing for retrieving/outputting correlated information and the medium form according to Embodiment 3.

(4) Processing for Retrieving/Outputting Correlated Information and a Medium Form FIG. 19 shows a general flow chart of the processing for retrieving/outputting correlated information and a medium form according to Embodiment 3. It is assumed herein that the medium form 301 is recovered in the scanner 60 when the medium form 301 is read with the scanner 60, so any device with a recovery function of the medium form 301 is used as the scanner 60. Also, description herein assumes a case where the network terminal equipment 70B is used as a retrieving unit as an example.

At first, as shown in FIG. 19, a mark (selection information) 51 is previously added to desired described information (Dicon) on a medium form 301 using the marker (selection information adding unit) 50.

Then, the medium form 301 with the mark(s) 51 added thereto is read by the scanner (reader) 60 and also recovered inside the scanner 60 (S1901). In this case, the scanner 60 reads a code area 302 from the medium form 301 as raster information and also reads a text section with the mark 51 added thereto. The medium form 301 after the mark added thereto has been read is recovered by a recovery mechanism in the device.

The network terminal equipment (retrieving unit) 70B fetches linkage information (linkage information table), file unit specifying information, and selection information from the code area 302 and the image data for the text section each read by the scanner 60 using the retrieval software for a client, identifies a file unit (a file server 20A or a file device 20B or the like) from the file unit specifying information, identifies description recognizing information (Dicon ID) from the selection information as well as the linkage information (linkage information table), and identifies a name of an original hypertext used to prepare the medium form 301 and a version of the hypertext according to the hypertext identifying information and the version information (S1902).

Then, determination is made as to whether the file is a local file or an information shared file according to the identified file unit (the file server 20A or file device 20B or the like) (S1903), the processing goes to step S1904 when it is determined that the file is a local file, and goes to step S1906 when it is determined that the file is an information shared file.

In the case of a local file, in other words, when the file device 20B is identified as a file unit, the network terminal equipment 70B converts description recognizing information (Dicon ID) to address information (an file address in the file device 20B) using the table of Dicon ID-address conversion stored therein, retrieves any appropriate correlated information file, transfers the retrieved correlated information file to the printer 40 connected to the local file (S1904), then, prepares medium form information from the hypertext in an appropriate version according to the name of the hypertext and the version thereof, transfers the medium form information to the printer 40 (S1905), and the processing goes to step S1909.

It should be noted that, when the network terminal equipment 70 is used as a retrieving unit, the network terminal equipment 70 transfers the file unit specifying information and description recognizing information (Dicon ID) to the network terminal equipment 70B in step S1904, and then, the network terminal equipment 70B retrieves any correlated information file, transfers the retrieved correlated information file to the network terminal equipment 70, prepares medium form information, also transfers the prepared information to the network terminal equipment 70, further transfers the information to a specified printer 40 via the network terminal equipment 70, and the processing goes to step S1909.

On the other hand, in the case of the information shared file, in other words, when the file server 20A is identified as a file unit, the network terminal equipment 70B transfers description recognizing information (Dicon ID) and file unit specifying information to the file server 20A (S1906).

The file server 20A converts, when having received the address (URL) of the correlated information file, the description recognizing information (Dicon ID) to address information (URL in the correlated information file) using the table of Dicon ID-address conversion stored therein, retrieves any appropriate correlated information file, and prepares medium form information from the hypertext in an appropriate version according to the name of the hypertext and the version thereof (S1907).

The retrieved correlated information file and the prepared medium form information are transferred to a specified printer 80 or 40 (S1908).

The printer 80 or 40 outputs the received correlated information file on recording paper as a correlated information file 81, and also outputs the received medium form information on recording paper as a medium form 301 (S1909).

As described above, in the processing for retrieving/outputting correlated information and a medium form, the medium form 301 that has been used for retrieving correlated information is recovered and a new medium form 301 is outputted, so that a new medium form 301 can always be provided to a user, which allows convenience in actual use to be improved. In addition, the recovered medium forms 301 can be provided for use again by deleting images thereon as a single unit. To describe more concretely, a method of removing images from a form by giving moist of a surface active agent thereto can be applied to toner images, while a method of deleting color with ultraviolet rays can be applied to color of a mark 51.

Figure 20:
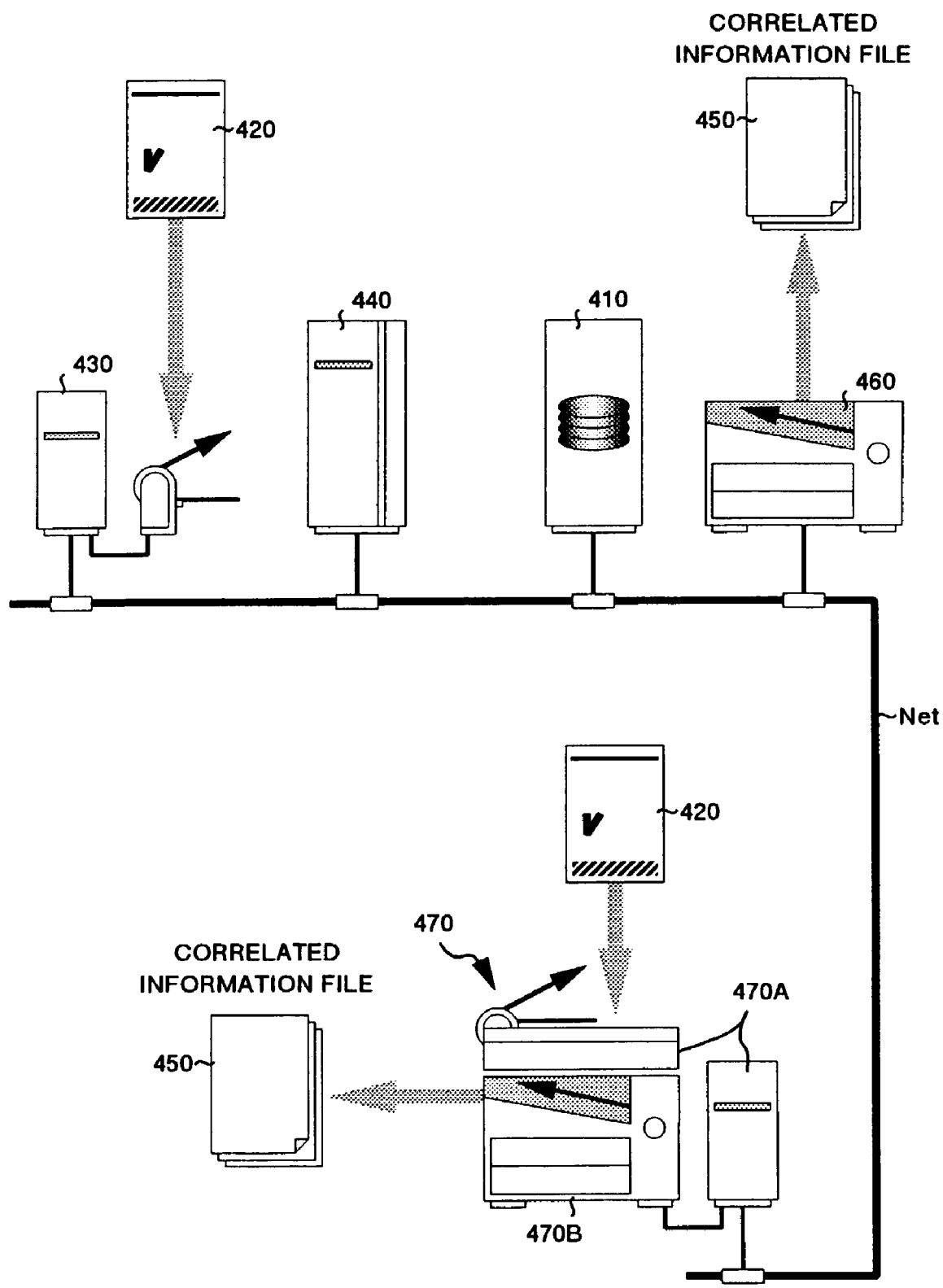
FIG. 20 is a system diagram showing a document information management system according to Embodiment 4 of the present invention.

FIG. 20 shows a system diagram of a document information management system according to Embodiment 4, and the system comprises a file device 410 as a file unit with a hypertext and information correlated, through link structure of the hypertext, to particular words, sentences, symbols, or graphics on the hypertext stored therein as a correlated information file; a medium form 420 with at least one described information comprising any of words, sentences, symbols, and graphics, linkage information for linking the described information to the correlated information file in the file device 410, and selection information for selecting particular described information among the described information recorded thereon; a scanner unit 430 as a correlated information identifying unit for reading image data from the medium form 420, identifying the correlated information file selected as described above according to the selection information as well as the linkage information in the read image data, and outputting an address of an appropriate correlated information file; a file server 440 as a correlated information file retrieving unit for receiving an address of a correlated information file from the scanner unit 430 and retrieving the appropriate correlated information file from the file device 410 according to the address of the correlated information file; a printer 460 as an output unit for printing the correlated information file retrieved by the file server 440 on recording paper and outputting the paper as a correlated information file 450; and a copying machine 470 with a scanner unit 470A as a correlated information identifying unit and a printer 470B as an output unit integrated into one device.

It should be noted that each of the scanner units (correlated information identifying units) 430 and 470A may comprise an existing device such as a server or a personal computer and a scanner connected thereto. For example, when selection information is read from a medium form 420 using a marking identifying method (a method of detecting a marked portion using a difference from a reference image), each of the scanner units reads a text section from the medium form 420 as raster information, also reads a code area of the medium form 420 as raster information, then identifies an appropriate correlated information file according to the read selection information and linkage information, and outputs an address of the correlated information file.

Each of the scanner units 430 and 470A also comprises software such as a two-dimensional bar code decoder, HTML source code developing software (e.g. a browser or the like for the Internet/Intranet), and marking identifying software.

It should be noted that the devices as described above are connected to a network Net as shown in the figure. It is assumed herein that the Internet/Intranet or the like is used as the network Net, but that the network is not particularly restricted thereto. One unit of each of the devices is shown in FIG. 20 to simplify the description, but it is needless to say that a plurality units of each of the devices can be present on the network.

It is assumed herein that the structure of the medium form 420 is the same as that of the medium form 201 (Refer to FIG. 2 to FIGS. 8A and 8B) according to Embodiment 1, and that an address of correlated information file is described with URL (uniform resource locator) in Embodiment 4.

Further, it is assumed that the medium form 420 is prepared from a hypertext in the same method as that of the medium form 201 according to Embodiment 1.

Figure 21:
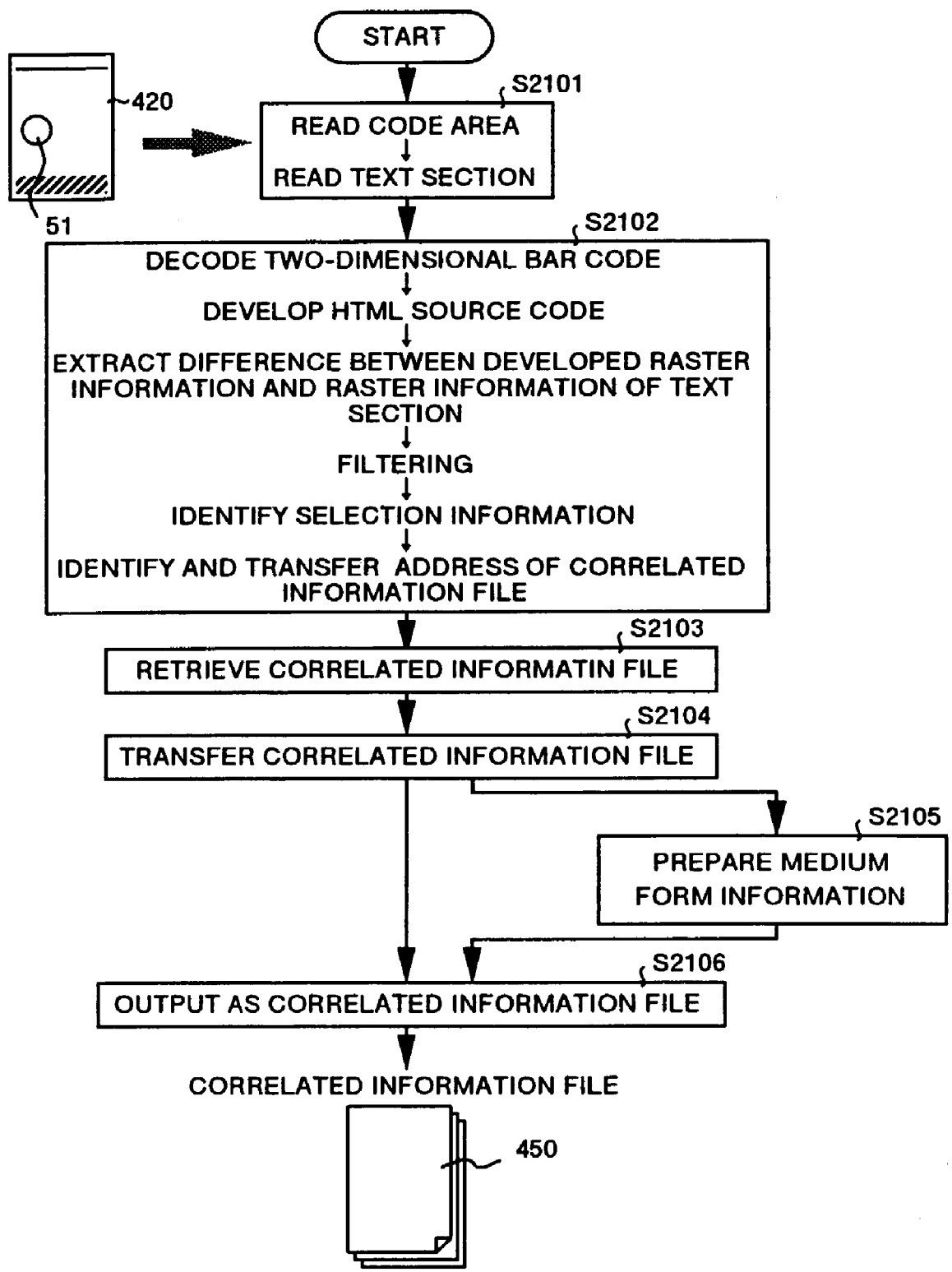
FIG. 21 is a flow chart schematically showing processing for retrieving/outputting correlated information according to Embodiment 4.

In the construction as described above, description is made for the processing for retrieving/outputting correlated information according to Embodiment 4 with reference to the general flow chart shown in FIG. 21. At first, as shown in FIG. 5, a mark (selection information) 51 is previously added to desired described information (Dicon) on a medium form 420 using a marker (selection information adding unit) 50.

Then, the medium form 420 with the mark(s) 51 added thereto is read by the scanner unit (correlated information identifying unit) 430 or 470A (S2101). In this case, each of the scanner units 430, 470A reads a code area 206 from the medium form 420 as raster information and also reads a text section with the mark(s) 51 added thereto. With those operations, linkage information and selection information are supposed to be read.

Then, each of the scanner units (correlated information identifying units) 430 and 470A decodes two-dimensional bar code of the code area 206 using the two-dimensional bar code decoder from the read code area 206 and image data for the text section, obtains HTML source code of the original hypertext and linkage information or the like, and then, develops the decoded HTML source code to raster information using the HTML source code developing software, extracts a difference between the developed raster information and the raster information in the read text section using the marking identifying software, obtains an image for the mark (selection information) 51 as well as a noise image (a slight displacement between the two raster information), further removes the noise image by filtering, and identifies the mark (selection information) 51. Then, each of the scanner units identifies described position information (Refer to FIG. 7 and FIG. 8) from the coordinate values of the mark 51, identifies an address (URL) of the correlated information file from the corresponding address information, and transfers and outputs the address to a file server 440 (S2102).

The file server (correlated information file retrieving unit) 440 retrieves, when having received an address (URL) of the correlated information file, an appropriate correlated information file from the appropriate file device 410 according to the address (URL) of the correlated information file (S2103).

The file server transfers the retrieved correlated information file to a printer 460 or to a printer 470B (S2104) However, when the correlated information file itself is found also a hypertext, as it is required to output the correlated information file as medium form information, the file server 440 prepares medium form information from the hypertext and transfers the medium form information to the printer 460 or 470B (S2105). Specification of the printer 460 or 470B as an address for transferring at that time can easily be realized by describing it on the medium form 420 or by selecting it on the medium form 420 although detailed description is omitted herein.

The printer 460 or 470B outputs the received correlated information file (including the medium form information) on recording paper as a correlated information file 450 (S2106).

As described above, with the document information management system according to Embodiment 4, continuity and correlation of information from a hypertext as a document in the digital world such as a computer system to a medium form 420 as a paper document are constructed through the linkage information on the medium form 420, so that a paper document can be incorporated in the document information management system in the digital world, direct access to the digital world can be achieved by using the paper document as a medium, and further a hypertext using the paper document (paper hypertext) can be realized.

Each of the scanner units (correlated information identifying units) 430 and 470A reads image data from the medium form 420, identifies the correlated information file selected as described above according to the selection information as well as the linkage information in the read image data, and outputs an address of an appropriate correlated information file, so that only the address (URL) of the correlated information file may be transferred to the file server (correlated information file retrieving unit) 440, which allows an amount of transmission data on the network Net to be reduced, costs to be reduced, and a transmission speed to be improved. Further the file server (correlated information file retrieving unit) 440 may only retrieve a correlated information file, so that load can be decentralized by the system on the whole, which allows high efficiency to be obtained.

When the correlated information file 450 is read by the scanner unit 430 and is outputted by the printer 460, any handy printer 460 or any printer 460 appropriate for a certain purpose connected to the network Net can be selected for use, so that convenience in actual use is improved.

Further, when any copying machine 470 with a scanner unit (correlated information identifying unit) 470A and a printer (an output unit) 470B integrated into one device is used, the system on the whole can be minimized, and reading as well as outputting can be executed by one device at a place, which allows operability to be improved.

Figure 22:
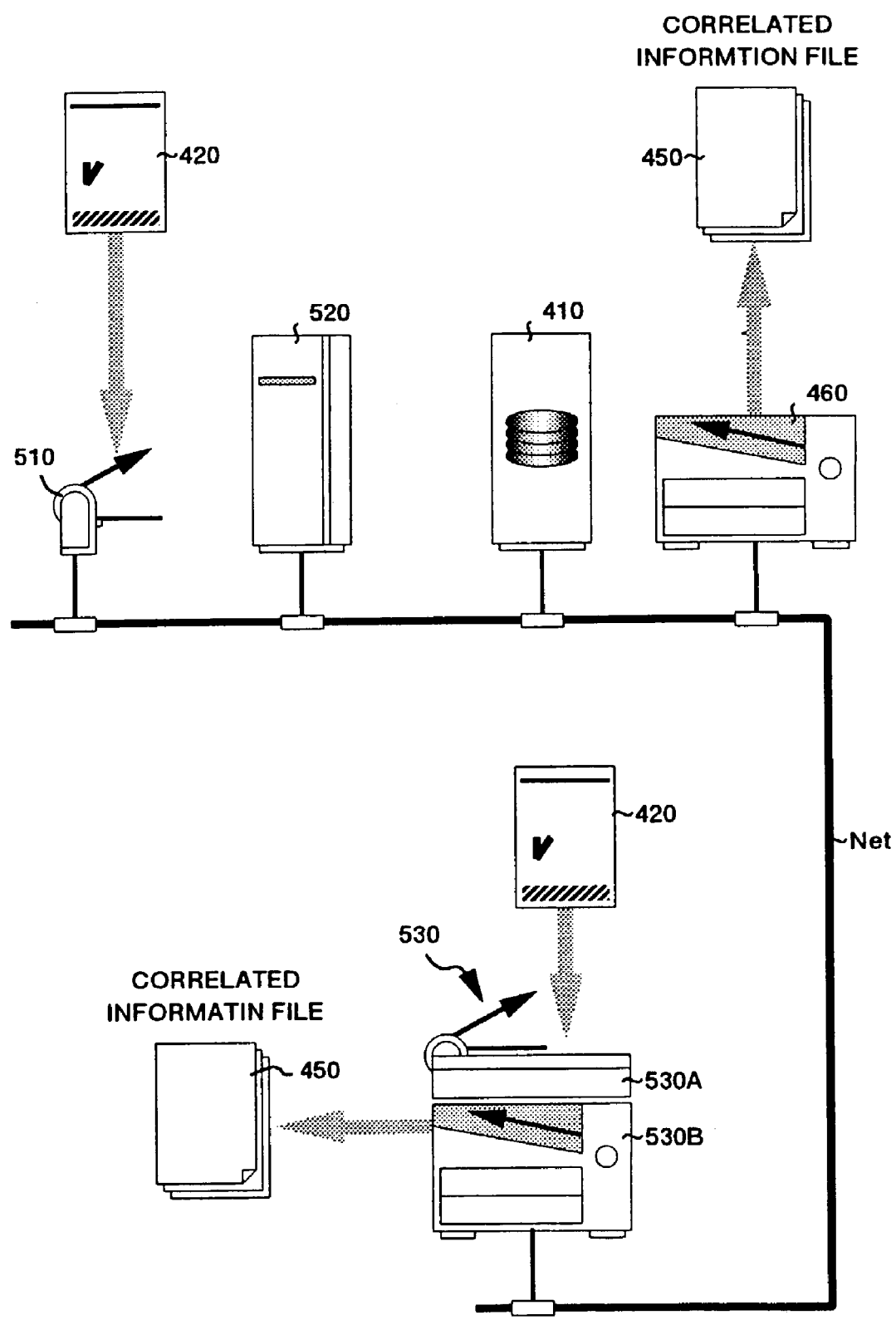
FIG. 22 is a system diagram showing a document information management system according to Embodiment 5 of the present invention.

FIG. 22 shows a system diagram of a document information management system according to Embodiment 5, and the system comprises a file device 410 as a file unit with a hypertext and information correlated, through link structure of the hypertext, to particular words, sentences, symbols, or graphics on the hypertext stored therein as a correlated information file; a medium form 420 with at least one described information comprising any of words, sentences, symbols, and graphics, linkage information for linking the described information to the correlated information file in the file device 410, and selection information for selecting particular described information among the described information recorded thereon; a scanner 510 as an image data reader for reading image data from the medium form 420; a file server 520 as a correlated information file identifying/retrieving unit for receiving image data from the scanner 510, identifying an address of the selected correlated information file according to the selection information as well as linkage information in the image data, and retrieving an appropriate correlated information file from the file device 410; a printer 460 as an output unit for printing the correlated information file retrieved by the file server 520 on recording paper and outputting the paper as a correlated information file 450; and a copying machine 530 with a scanner 530A as an image data reader and a printer 530B as an output unit integrated into one device.

In addition, any existing scanner can be used as a scanner 510, any existing printer can be used as a printer 460, and further any existing copying machine can be used as a copying machine 530.

The file server (correlated information file identifying/retrieving unit) 520 comprises software such as a two-dimensional bar code decoder, HTML source code developing software (e.g. a browser or the like for the Internet/Intranet), and marking identifying software.

It should be noted that the devices as described above are connected to a network Net as shown in the figure. It is assumed herein that the Internet/Intranet or the like is used as the network Net, but the network is not particularly restricted thereto. One unit of each of the devices is shown in FIG. 22 to simplify the description, but it is needless to say that a plurality units of each of the devices can be present on the network respectively.

The structure of the medium form 420 is the same as that of the medium form 201 (Refer to FIG. 2 to FIGS. 8A and 8B) according to Embodiment 1, and an address of correlated information file is supposed to be described with URL (uniform resource locator) in Embodiment 5.

Further, it is assumed herein that the medium form 420 is prepared from a hypertext in the same method as that of the medium form 201 according to Embodiment 1.

Figure 23:
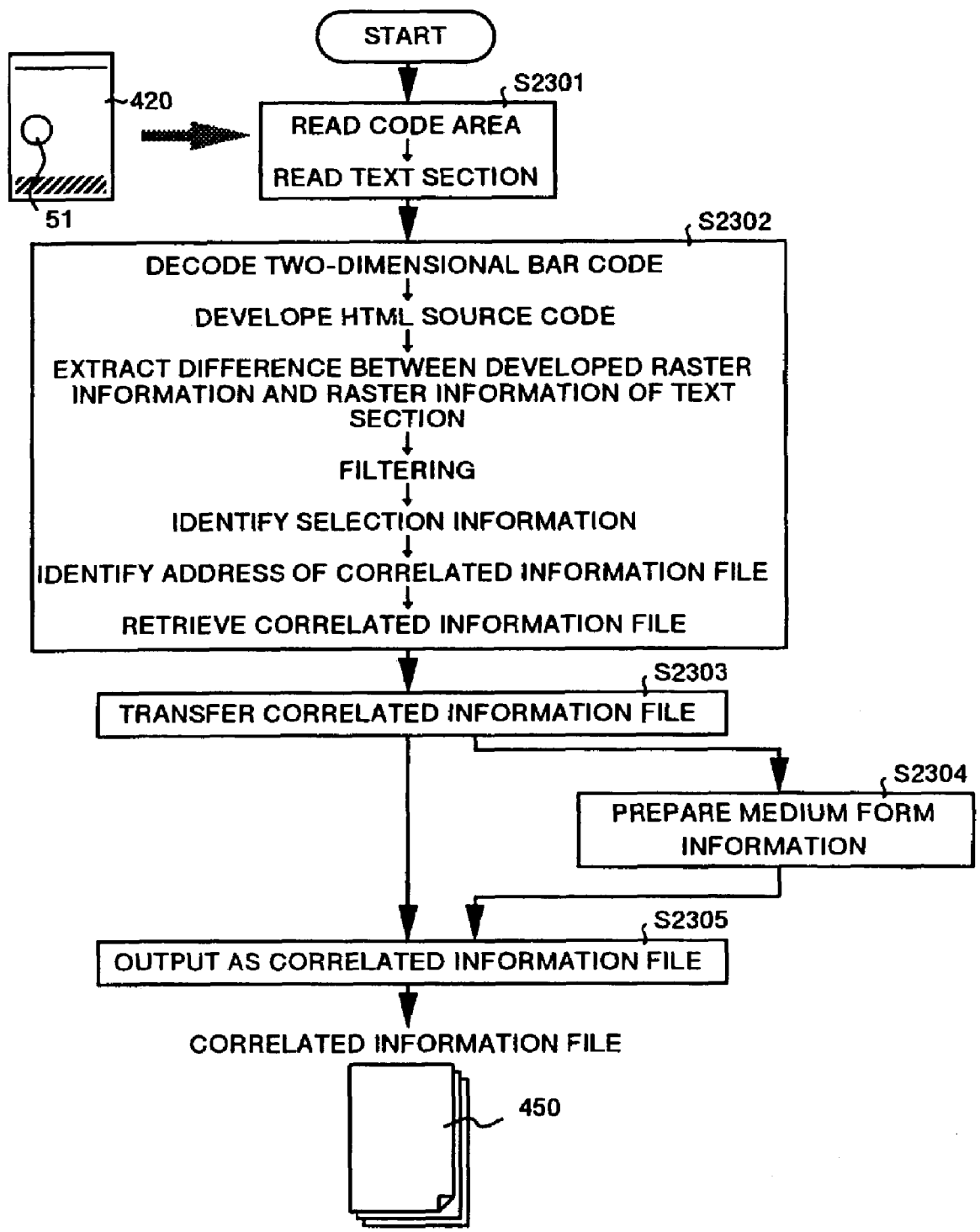
FIG. 23 is a flow chart schematically showing processing for retrieving/outputting correlated information according to Embodiment 5.

In the construction as described above, description is made for the processing for retrieving/outputting correlated information according to Embodiment 5 with reference to the general flow chart shown in FIG. 23. At first, as shown in FIG. 5, a mark (selection information) 51 is previously added to desired described information (Dicon) on a medium form 420 using a marker (selection information adding unit) 50.

Then, the medium form 420 with the mark(s) 51 added thereto is read by the scanner 510 or 530A (S2301). In this case, each of the scanners 510, 530A reads a code area 206 from the medium form 420 as image data (raster information) and also reads a text section with the mark(s) 51 added thereto. With those operations, linkage information and selection information are supposed to be read.

Then, the read image data is transferred to the file server (correlated information file identifying/retrieving unit) 520, the file server 520 decodes two-dimensional bar code of the code area 206 using the two-dimensional bar code decoder from the read code area 206 and image data for the text section, obtains HTML source code of the original hypertext and the linkage information or the like, and then, develops the decoded HTML source code to raster information using the HTML source code developing software, extracts a difference between the developed raster information and the raster information in the read text section using the marking identifying software, obtains an image for the mark (selection information) 51 as well as a noise image (a slight displacement between the two raster information), further removes the noise image by filtering, and identifies the mark (selection information) 51. Then, the file server identifies described position information (Refer to FIG. 7 and FIGS. 8A and 8B) from the coordinate values of the mark 51, and identifies an address (URL) of the correlated information file from the corresponding address information. Then the file server 520 retrieves an appropriate correlated information file from the appropriate file device 410 according to the address (URL) of the identified correlated information file (S2302).

Then, the file server 520 transfers the retrieved correlated information file to a printer 460 or to a printer 530B (S2303). However, when the correlated information file itself is also found a hypertext, as it is required to output the correlated information file as medium form information, the file server 520 prepares medium form information from the hypertext and transfers the medium form information to the printer 460 or 530B (S2304). Specification of the printer 460 or 530B as an address for transferring at that time can easily be realized by describing it on the medium form 420 or by selecting it on the medium form 420 although detailed description is omitted herein.

The printer 460 or 530B outputs the received correlated information file (including the medium form information) on recording paper as a correlated information file 450 (S2305)

As described above, with the document information management system according to Embodiment 5, continuity and correlation of information from a hypertext as a document in the digital world such as a computer system to a medium form 420 as a paper document are constructed through the linkage information on the medium form 420, so that a paper document can be incorporated in the document information management system in the digital world, direct access to the digital world can be achieved by using the paper document as a medium, and further a hypertext using the paper document (paper hypertext) can be realized.

In addition, each of the scanners (image data reader) 510 and 530A simply reads image data, from a medium form 420, so that any existing scanner can be used.

When the correlated information file 450 is read by the scanner 430 and is outputted by the printer 460, any handy printer 460 or any printer 460 appropriate for a certain purpose connected to the network Net can be selected for using, so that convenience in actual use is improved.

Further, when any copying machine 530 with a scanner 530A and a printer 530B integrated into one device is used, the system on the whole can be minimized, and reading as well as outputting can be executed by the identical device at the same place, which allows operability to be improved.

A document information management system according to Embodiment 6 is an example in which all the units or some of the document information management system according to Embodiment 5 shown in FIG. 22 are integrated into one apparatus.

Figure 24:
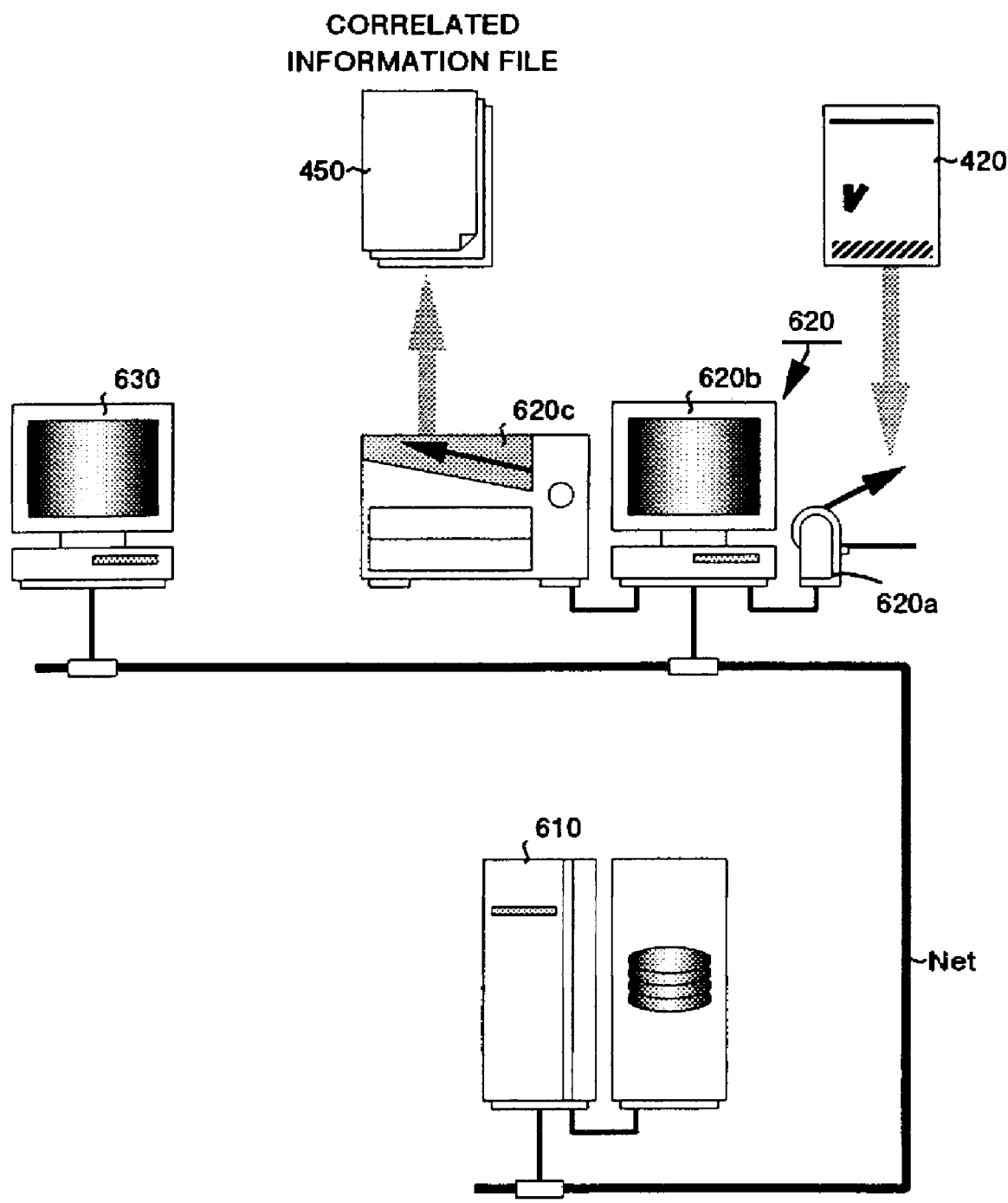
FIG. 24 is a system diagram showing a document information management system according to Embodiment 6 of the present invention.

FIG. 24 shows a system diagram of the document information management system according to Embodiment 6, and the system comprises a file server 610 as a file unit; a PUI station apparatus 620 comprising a scanner 620*a* as an image data reader for reading image data from a medium form 420, a network terminal equipment 620*b* as a correlated information file identifying/retrieving unit for receiving image data from the scanner 620*a*, identifying an address of the selected correlated information file according to selection information and linkage information in the image data, and retrieving an appropriate correlated information file from the file server 610, and a printer 620*c* as an output unit for printing the retrieved correlated information file on recording paper by the network terminal equipment 620*b* and outputting the paper as a correlated information file 450; and a network terminal equipment 630 as a display unit for displaying the correlated information file on a screen.

It should be noted that the PUI station apparatus 620 is so constructed that the scanner 620*a* and the printer 620*c* are integrated by being connected to the network terminal equipment 620*b* connected to the network Net with a serial cable or a parallel cable, but the construction is not always restricted thereto, and for example, the network terminal equipment 620*b*, scanner 620*a*, and printer 620*c* may physically be integrated into one apparatus.

With the construction as described above, with Embodiment 6, the same effects as those in Embodiment 5 can be achieved and a series of works can be performed with a single device, which allows operability and convenience in actual use to be improved.

A document information management system according to Embodiment 7 is realized by providing the document information management system according to any of Embodiment 4 and Embodiment 5 on one line of the network Net.

FIG. 25 shows a system diagram of the document information management system according to Embodiment 7, and the system comprises a file device 410 as a file unit, a scanner unit 430 as a correlated information identifying unit, a file server 440 as a correlated information file retrieving unit, a printer 460 as an output unit, a scanner 510 as an image data reader, and a filer server 520 as a correlated information file identifying/retrieving unit. In the figure, the same reference numerals as those in Embodiment 4 or Embodiment 5 indicate the common configuration therebetween, so that detailed description is omitted herein.

It should be noted that, as shown in the figure, the file unit, correlated information identifying unit, image data reader, correlated information file retrieving unit, correlated information file identifying/retrieving unit, and output unit are network terminal equipments or network peripheral devices each connected to the network Net respectively. Such construction that one unit for each of the units is provided on the network Net is shown to simplify the description herein, but it is clearly understood that a plurality units of each of the units can be present on the network Net.

The scanner (image data reader) 510 searches for the file server 520 as a correlated information file identifying/retrieving unit from the file server (correlated information file retrieving unit) 440 as well as from the file server (correlated information file identifying/retrieving unit) 520 connected to the network and outputs the read image data.

Also, the scanner unit (correlated information identifying unit) 430 searches for an available file server from the file server (correlated information file retrieving unit) 440 and the file server (correlated information file identifying/retrieving unit) 520 connected to the network Net, identifies the selected correlated information file according to the selection information and linkage information in the read image data when the available retrieving unit is the file server (correlated information file retrieving unit) 440, outputs an address of an appropriate correlated information file, and outputs the read image data as it is when the available file sever is the file server (correlated information file identifying/retrieving unit) 520.

Further, it is assumed herein that an address of the correlated information file is described with URL (uniform resource locator).

Figure 26:
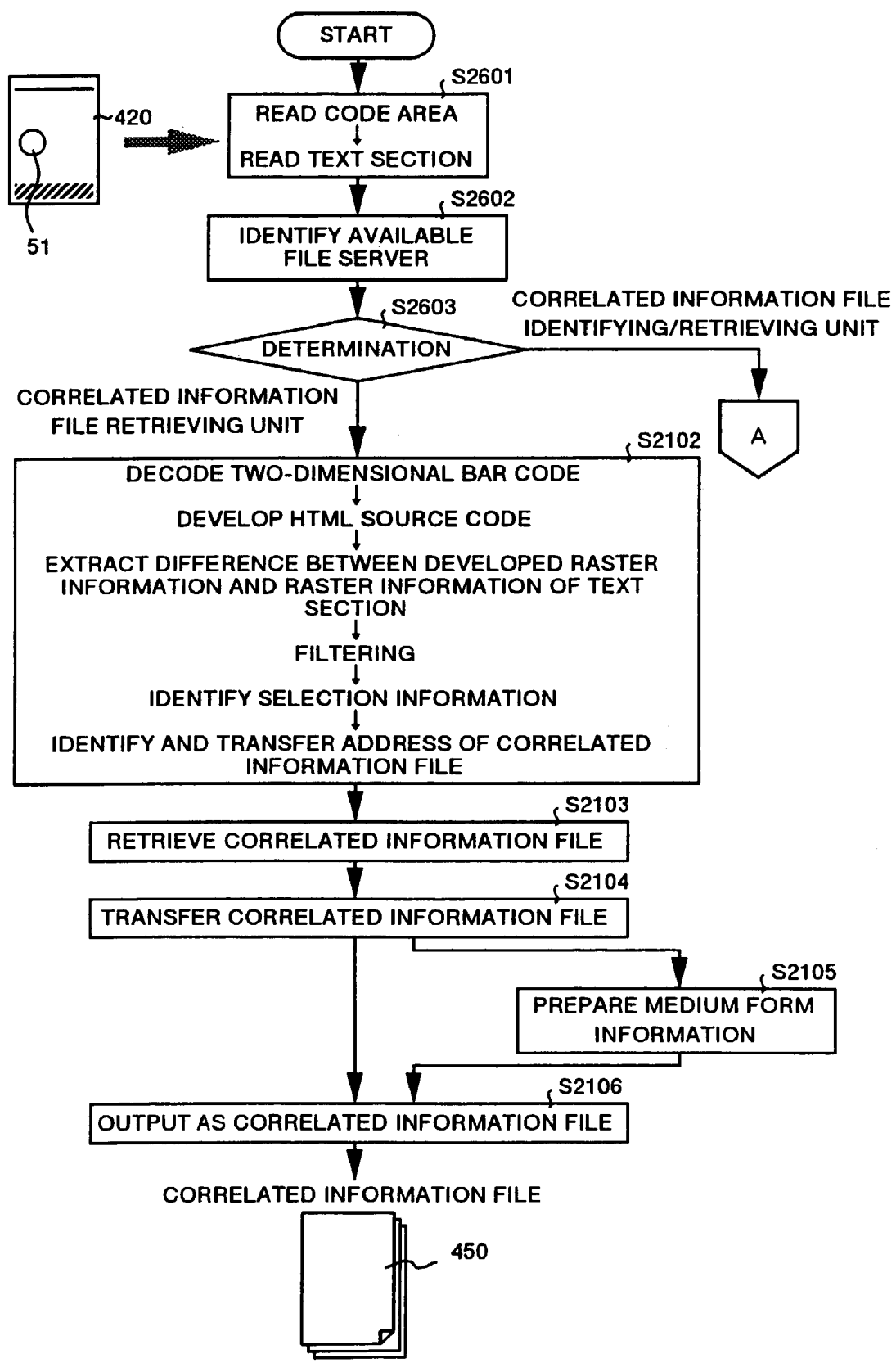
FIG. 26 is a flow chart schematically showing processing for retrieving/outputting correlated information when the medium form is read by using a scanner unit (correlated information identifying unit) in Embodiment 7.
Figure 27:
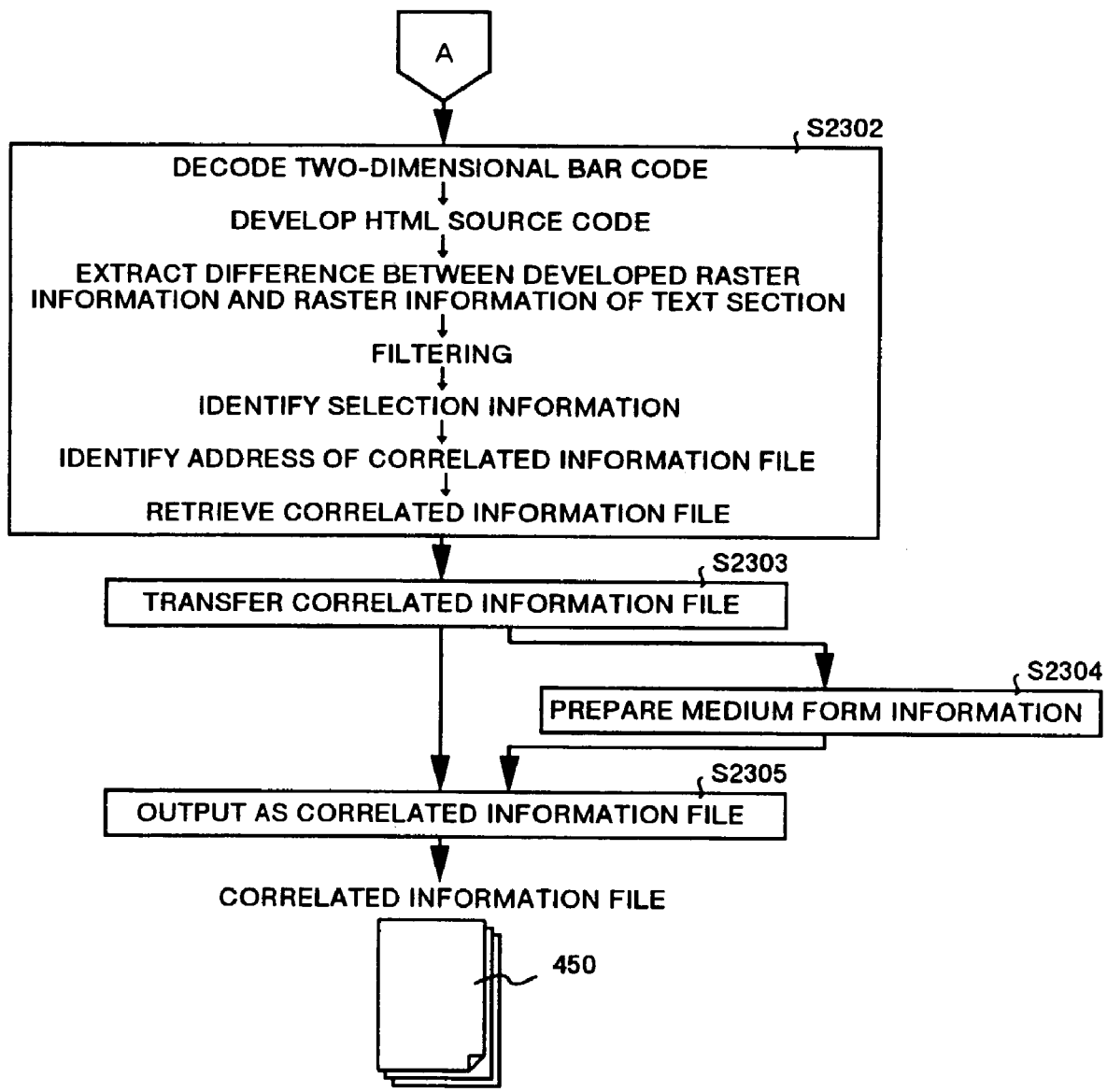
FIG. 27 is a flow chart schematically showing processing for retrieving/outputting correlated information when the medium form is read by using the scanner unit (correlated information identifying unit) in Embodiment 7.
Figure 28:
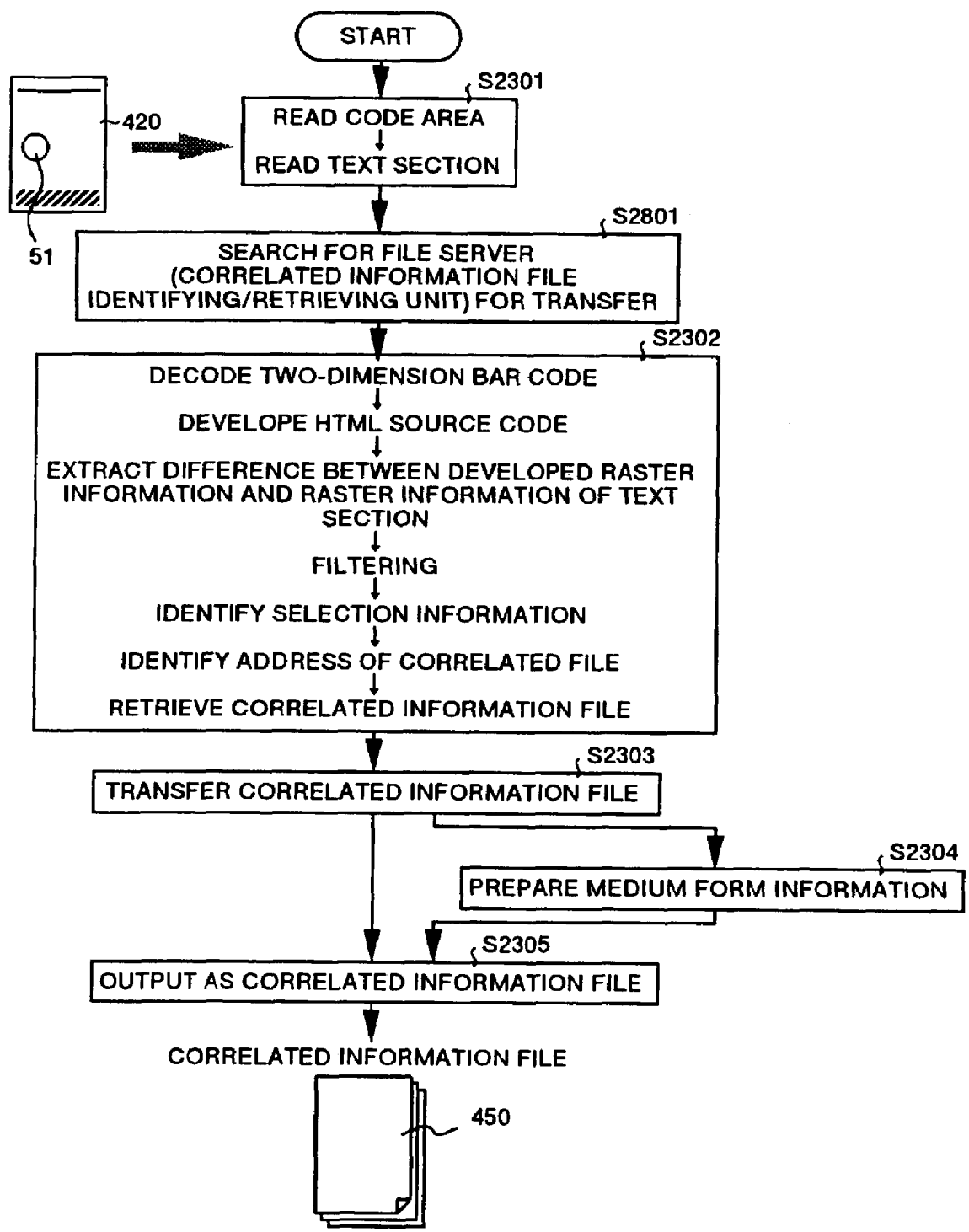
FIG. 28 is a flow chart schematically showing processing for retrieving/outputting correlated information when the medium form is read by using a scanner (image data reader) in Embodiment 7.

In the construction as described above, description is made for operations specific to Embodiment 7 with reference to FIG. 26 to FIG. 28.

Description is made for the processing for retrieving/outputting correlated information when a medium form 420 is read by the scanner unit (correlated information identifying unit) 430 with reference to the general flow chart shown in FIG. 26 and FIG. 27. It should be noted that, in FIG. 26 and FIG. 27, steps S2102 to S2106 are the same as those in FIG. 21, and steps S2302 to S2305 are the same as those in FIG. 23, so that detailed description is omitted herein.

At first, as shown in FIG. 5, a mark (selection information) 51 is previously added to desired described information (Dicon) on a medium form 420 using a marker (selection information adding unit) 50.

Then, the medium form 420 with the mark(s) 51 added thereto is read by the scanner unit (correlated information identifying unit) 430 (S2601). In this case, the scanner unit 430 reads a code area 206 from the medium form 420 as raster information and also reads a text section with the mark(s) 51 added thereto. With those operations, linkage information and selection information are read.

Then, the scanner unit (correlated information identifying unit) 430 identifies a file server by searching for an available file server (S2602), and determines whether the available file server is a file server 440 as a correlated information file retrieving unit or a file server 520 as a correlated information file identifying/retrieving unit (S2603).

When it is determined that the available file server is the file server (correlated information file retrieving unit) 440, the scanner unit 430 decodes two-dimensional bar code of the code area 206, develops the decoded HTML source code to raster information, extracts a difference between the developed raster information and the raster information in the read text section, obtains an image for the mark (selection information) 51 as well as a noise image (a slight displacement between the two raster information), further executes filtering thereto, and identifies the mark (selection information) 51. Then, the scanner unit identifies described position information, identifies an address (URL) of the correlated information file from the corresponding address information, and transfers and outputs the address to the file server 440 (S2102).

The file server (correlated information file retrieving unit) 440 retrieves an appropriate correlated information file from the appropriate file device 410 according to the address (URL) of the correlated information file (S2103), and transfers the retrieved correlated information file to the printer 460 (S2104). However, when the correlated information file itself is found a hypertext, as it is required to output the correlated information file as medium form information, the file server 440 prepares medium form information from the hypertext and transfers the medium form information to the printer 460 (S2105).

The printer 460 outputs the received correlated information file (including the medium form information) on recording paper as a correlated information file 450 (S2106).

On the other hand, when it is determined in step S2603 that the available file server is the file server (correlated information file identifying/retrieving unit) 520, the read image data is transferred to the file server (correlated information file identifying/retrieving unit) 520, the file server 520 decodes the two-dimensional bar code from the read code area 206 and image data for the test section, develops the decoded HTML source code to raster information, extracts a difference between the developed raster information and the raster information in the read text section, obtains an image for the mark (selection information) 51 as well as a noise image (a slight displacement between the two raster information), further removes the noise image by filtering, and identifies the mark (selection information) 51. Then, the file server identifies described position information, identifies an address (URL) of the correlated information file from the corresponding address information, and retrieves an appropriate correlated information file from the appropriate file device 410 according to the address (URL) of the identified correlated information file (S2302).

Then, the file server 520 transfers the retrieved correlated information file to the printer 460 (S2303) However, when the correlated information file itself is also found a hypertext, as it is required to output the correlated information file as medium form information, the file server 520 prepares medium form information from the hypertext and transfers the medium form information to the printer 460 (S2304).

The printer 460 outputs the received correlated information file (including the medium form information) on recording paper as a correlated information file 450 (S2305).

Next description is made for the processing for retrieving/outputting correlated information when a medium form 420 is read by the scanner (image data reader) 510 with reference to the general flowchart shown in FIG. 28. It should be noted that the general flow chart shown in FIG. 28 is basically the same as that in Embodiment 5 shown in FIG. 23, so that description is made herein only for the different points therefrom.

At first, the medium form 420 with the mark(s) 51 added thereto is read by the scanner (image data reader) 510 (S2301)

Then, the scanner (image data reader) 510 searches for the file server 520 as a correlated information file identifying/retrieving unit from the file server (correlated information file retrieving unit) 440 as well as from the file server (correlated information file identifying/retrieving unit) 520 connected to the network and transfers the read image data (S2801).

As described above, with Embodiment 7, the document information management system comprises the scanner unit (correlated information file identifying unit) 430, scanner (image data reader) 510, file server (correlated information file retrieving unit) 440, and file server (correlated information file identifying/retrieving unit) 520, and the side of the scanner unit (correlated information file identifying unit) 430 or the scanner (image data reader) 510 retrieves a file server capable of being combined with the function thereof and executes processing, so that different types of file server can be present together with each other on the network Net. In other words, it is possible to select any optimal file server under such circumstances that both the file server (correlated information file retrieving unit) 440 and file server (correlated information file identifying/retrieving unit) 520 are present on the network Net.

As described above, the document information management system according to the present invention comprises a hypertext preparing unit for preparing a hypertext; a file unit for storing therein hypertexts prepared by the hypertext preparing unit and correlated information files correlated to each other through link structure of the hypertexts; a medium form information preparing unit for receiving the hypertext, preparing image extraction information by extracting only image data from information in the hypertext, preparing particular described information as well as linkage information for linking the described information to a correlated information file in the file unit from information having link structure such as a button, a switch, or an icon of information in the hypertext, and preparing medium form information by synthesizing the image extraction information, described information, and linkage information; a medium form output unit for printing the medium form information on recording paper and outputting the recording paper as a medium form; a selection information adding unit for adding selection information for selecting a desired described information from those printed on the medium form; a reader for reading the selection information and linkage information from the medium form with the selection information added via the selection information adding unit; a retrieving unit for retrieving an appropriate correlated information file from the file unit according to the selection information as well as linkage information read by the reader; and an output unit for outputting the correlated information file retrieved by the retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

The document information management system according to the present invention comprises a plurality of file units each storing therein hypertexts and correlated information files correlated to each other through link structure of the hypertexts; a medium form information preparing unit for receiving the hypertext and preparing image extraction information by extracting only image data from the information in the hypertext, preparing particular described information as well as linkage information for linking the described information to a correlated information file in a particular file unit among the plurality of file units from the information having link structure such as a button, a switch, or an icon of the information in the hypertext, further preparing file unit specifying information for specifying a file unit in which the appropriate hypertext is stored from the plurality of file units, and preparing the medium form information by synthesizing the image extraction information, described information, linkage information, and file unit specifying information; a medium form output unit for printing the medium form information on recording paper and outputting the recording paper as a medium form; a selection information adding unit for adding selection information for selecting desired described information from those printed on the medium form; a reader for reading the selection information, linkage information, and file unit specifying information from the medium form with the selection information added via the selection information adding unit; a retrieving unit for retrieving an appropriate correlated information file from an appropriate file unit among the plurality of file units according to the selection information, linkage information, and file unit specifying information read by the reader; and an output unit for outputting the correlated information file retrieved by the retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

In the document information management system according to the present invention further comprises a display unit for displaying the medium form information on a screen thereof, so that workability and convenience in actual use can further be improved.

In the document information management system according to the present invention, the retrieving unit further retrieves an appropriate hypertext from the appropriate file unit according to the file unit specifying information and linkage information read by the reader, and the output unit further outputs the hypertext retrieved by the retrieving unit, so that convenience of the system can be improved.

In the document information management system according to the present invention, the linkage information includes described position information indicating a described position of each described information on the medium form and description recognizing information for recognizing described information described at a position indicated by the described position information, and the retrieving unit has an intermediate address table for converting the description recognizing information to an address of the correlated information file, so that addresses of the correlated information file can integrally be managed, which makes it easy to construct the system and to change correlated information file or the like.

In the document information management system according to the present invention, the file unit specifying information comprises file unit identifying information for identifying a file unit in which the hypertext is stored, hypertext identifying information for identifying an original hypertext used to prepare the medium form, and version information for identifying a version of the original hypertext, so that identification of a file unit, identification of an original hypertext, and further identification of a version thereof can be performed. In other words, medium forms and the original hypertext thereof can accurately and easily be managed.

The document information management system according to the present invention comprises a file unit with information concerning particular words, sentences, symbols, or graphics previously stored therein as a correlated information file; a medium form with at least one described information comprising any of words, sentences, symbols, and graphics, linkage information for linking the described information to the correlated information file in the file unit, and selection information for selecting particular described information among the described information recorded thereon; a correlated information identifying unit for reading image data from the medium form, identifying the correlated information file selected as described above according to the selection information as well as the linkage information in the read image data, and outputting an address of an appropriate correlated information file; a correlated information file retrieving unit for receiving an address of a correlated information file from the correlated information identifying unit and retrieving the appropriate correlated information file from the file unit according to the address of the correlated information file; and an output unit for outputting the correlated information file retrieved by the correlated information file retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

Also, the correlated information identifying unit reads image data from the medium form and outputs an address of the correlated information file, so that a data amount transferred to the correlated information file retrieving unit can be reduced. In other words, as a small amount of data is transferred, the system has advantages in a transmission speed and cost when the units are connected to each other through a network.

Further, the correlated information file retrieving unit may only retrieve a correlated information file according to an address of the correlated information file, so that load onto the correlated information file retrieving unit can be reduced, which is suitable for construction of a large-scale document information management system.

In the document information management system according to the present invention, an address of the correlated information is described with URL (uniform resource locator), so that, as a small amount of data is transferred, the system has advantages in a transmission speed and cost when the units are connected to each other through a network.

In the document information management system according to the present invention, the file unit, correlated information identifying unit, correlated information file retrieving unit, and output unit are network terminal equipments or network peripheral devices connected to a network respectively, and a plurality of the units may be present in the system, so that a large-scale system can easily be constructed, and extension as well as change of the system can easily be performed.

In the document information management system according to the present invention, the correlated information identifying unit and output unit are integrated into one apparatus, so that operability and convenience in actual use can be improved.

The document information management system according to the present invention comprises a file unit with information relating to particular words, sentences, symbols, or graphics previously stored therein as a correlated information file; a medium form with at least one described information comprising any of words, sentences, symbols, and graphics, linkage information for linking the described information to the correlated information file in the file unit, and selection information for selecting particular described information among the described information recorded thereon; an image data reader for reading image data from the medium form; a correlated information file identifying/retrieving unit for receiving the image data from the image data reader, identifying an address of the selected correlated information file according to the selection information and linkage information in the image data, and retrieving an appropriate correlated information file from said file unit; and an output unit for outputting the correlated information file retrieved by the correlated information file identifying/retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

In addition, the image data reader only reads image data from the medium form, so that any existing scanner or the like can be used, which makes it easy to construct the system.

In the document information file management system according to the present invention, an address of the correlated information file is described with URL (uniform resource locator), so that, as a small amount of data is transferred, the system has advantages in a transmission speed and cost when the units are connected to each other through a network.

In the document information file management system according to the present invention, the file unit, image data reader, correlated information file identifying/retrieving unit and output unit are network terminal equipments or network peripheral devices connected to a network respectively and a plurality of the units may be present in the system, so that a large-scale system can easily be constructed, and extension as well as change of the system can easily be performed.

In the document information file management system according to the present invention, the image data reader and output unit are integrated into one apparatus, so that operability and convenience in actual use can be improved.

In the document information file management system according to the present invention, further comprises a display unit for displaying the correlated information file on a screen thereof, so that operability and convenience in actual use can be improved.

In the document information file management system according to the present invention, all or some of the units each constituting the document information management system are integrated into one apparatus, so that the apparatus or the system can be minimized, which is suitable for a small-scale system.

The document information management system according to the present invention comprises a file unit with information relating to particular words, sentences, symbols, or graphics previously stored therein as a correlated information file; a medium form with at least one described information comprising any of words, sentences, symbols, and graphics, linkage information for linking the described information to the correlated information file in the file unit, and selection information for selecting particular described information among the described information recorded thereon; a correlated information identifying unit for reading image data from the medium form, identifying the selected correlated information file according to the selection information as well as linkage information in the read image data, and outputting an address of an appropriate correlated information file; a correlated information file retrieving unit for receiving an address of the correlated information file from the correlated information identifying unit and retrieving an appropriate correlated information file from the file unit according to the address of the correlated information file; an image data reader for reading image data from the medium form; a correlated information file identifying/retrieving unit for receiving image data from the image data reader, identifying an address of the selected correlated information file according to the selection information and linkage information in the image data, and retrieving the appropriate correlated information file from the file unit; and an output unit for outputting the correlated information file retrieved by the correlated information file retrieving unit or the correlated information file identifying/retrieving unit, so that continuity and correlation of information between a digital world such as a computer system and a paper document can be constructed, a paper document can be incorporated in the document information management system in the digital world, direct access to the digital world can be achieved by using the paper document as a medium, and further a hypertext using the paper document (paper hypertext) can be realized.

In addition, when the medium form is to be read, the correlated information identifying unit or image data reader can be used, so that flexibility in system construction or in extension or change of the system can be enhanced.

In the document information file management system according to the present invention, the file unit, correlated information identifying unit, image data reader, correlated information file retrieving unit, correlated information file identifying/retrieving unit and output unit are network terminal equipments or network peripheral devices connected to a network respectively and a plurality of the units may be present in the system, so that a large-scale system can easily be constructed, and extension as well as change of the system can easily be performed.

In the document information file management system according to the present invention, the image data reader searches for the correlated information file identifying/retrieving unit from the correlated information file retrieving units as well as from the correlated information file identifying/retrieving units connected to the network and outputs the read image data, so that the image data reader for reading a medium form retrieves an available retrieving unit (correlated information file identifying/retrieving unit) and executes the processing, and for this reason, different types of retrieving units can be present on a network. In other words, flexibility in system construction or in extension or change of the system can be enhanced.

In the document information file management system according to the present invention, the correlated information identifying unit searches for an available retrieving unit from the correlated information file retrieving units and correlated information file identifying/retrieving units connected to the network, identifies the selected correlated information file according to the selection information and linkage information in the read image data when the available retrieving unit is the correlated information file retrieving unit, outputs an address of an appropriate correlated information file, and outputs the read image data as it is when the available retrieving unit is the correlated information file identifying/retrieving unit, so that the correlated information identifying unit for reading a medium form retrieves an available retrieving unit (correlated information file retrieving unit or correlated information file identifying/retrieving unit) and executes the processing, and for this reason, different types of retrieving units can be present on a network. In other words, flexibility in system construction or in extension or change of the system can be enhanced.

In the document information file management system according to the present invention, an address of the correlated information file is described with URL (uniform resource locator), so that, as a small data amount is transferred, the system has advantages in a transmission speed and cost when the units are connected to each other through a network.

This application is based on Japanese patent application No. HEI 9-031901 filed in the Japanese Patent Office on Feb. 17, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer document information management system that prepares a medium form from a hypertext, comprising:
  a hypertext preparing unit for preparing the hypertext;
  a file unit for storing therein hypertexts prepared by said hypertext preparing unit and correlated information files correlated to each other through link structure of said hypertexts;
  a medium form information preparing unit for receiving said hypertext, preparing image extraction information from the hypertext for printing, preparing particular described information as well as linkage information for linking said described information to a correlated information file in said file unit from information having link structure, and preparing medium form information by synthesizing said image extraction information, described information, and linkage information;
  a medium form output unit for printing said medium form information on recording paper and outputting the recording paper as a medium form;
  a selection information adding unit for adding selection information for selecting a desired described information from those printed on said medium form;
  a reader for reading said selection information and linkage information from said medium form with the selection information added via said selection information adding unit;
  a retrieving unit for retrieving an appropriate correlated information file from said file unit according to the selection information as well as linkage information read by said reader; and
  an output unit for outputting the correlated information file retrieved by said retrieving unit;
  wherein said linkage information includes described position information indicating a described position of each described information on said medium form and description recognizing information for recognizing described information described at a position indicated by said described position information, and said retrieving unit has an intermediate address table for converting said description recognizing information to an address of said correlated information file.

2. A computer document information management system that prepares a medium form from a hypertext, comprising:
  a plurality of file units each storing therein hypertexts and correlated information files correlated to each other through link structure of said hypertexts;
  a medium form information preparing unit for receiving said hypertext and preparing image extraction information from the hypertext for printing, preparing particular described information as well as linkage information for linking said described information to a correlated information file in a particular file unit among said plurality of file units from the information having link structure, further preparing file unit specifying information for specifying a file unit in which the appropriate hypertext is stored from said plurality of file units, and preparing the medium form information by synthesizing said image extraction information, described information, linkage information, and file unit specifying information;
  a medium form output unit for printing said medium form information on recording paper and outputting the recording paper as a medium form;
  a selection information adding unit for adding selection information for selecting desired described information from those printed on said medium form;
  a reader for reading said selection information, linkage information, and file unit specifying information from said medium form with the selection information added via said selection information adding unit;
  a retrieving unit for retrieving an appropriate correlated information file from an appropriate file unit among said plurality of file units according to the selection information, linkage information, and file unit specifying information read by said reader; and
  an output unit for outputting the correlated information file retrieved by said retrieving unit;
  wherein said linkage information includes described position information indicating a described position of each described information on said medium form and description recognizing information for recognizing described information described at a position indicated by said described position information, and said retrieving unit has an intermediate address table for converting said description recognizing information to an address of said correlated information file.

3. A computer document information management system that prepares a medium form from a hypertext, comprising:
  a hypertext preparing unit for preparing the hypertext;
  a file unit for storing therein hypertexts prepared by said hypertext preparing unit and correlated information files correlated to each other through link structure of said hypertexts;
  a medium form information preparing unit for receiving said hypertext, preparing image extraction information from the hypertext for printing, preparing particular described information as well as linkage information for linking said described information to a correlated information file in said file unit from information having link structure, and preparing medium form information by synthesizing said image extraction information, described information, and linkage information;

a medium form output unit for printing said medium form information on recording paper and outputting the recording paper as a medium form;

a selection information adding unit for adding selection information for selecting a desired described information from those printed on said medium form;

a reader for reading said selection information and linkage information from said medium form with the selection information added via said selection information adding unit;

a retrieving unit for retrieving an appropriate correlated information file from said file unit according to the selection information as well as linkage information read by said reader; and an output unit for outputting the correlated information file retrieved by said retrieving unit, wherein all the linkage information is provided in a page footer.

4. A computer document information management system that prepares a medium form from a hypertext, comprising:

a plurality of file units each storing therein hypertexts and correlated information files correlated to each other through link structure of said hypertexts;

a medium form information preparing unit for receiving said hypertext and preparing image extraction information from the hypertext for printing, preparing particular described information as well as linkage information for linking said described information to a correlated information file in a particular file unit among said plurality of file units from the information having link structure, further preparing file unit specifying information for specifying a file unit in which the appropriate hypertext is stored from said plurality of file units, and preparing the medium form information by synthesizing said image extraction information, described information, linkage information, and file unit specifying information;

a medium form output unit for printing said medium form information on recording paper and outputting the recording paper as a medium form;

a selection information adding unit for adding selection information for selecting desired described information from those printed on said medium form;

a reader for reading said selection information, linkage information, and file unit specifying information from said medium form with the selection information added via said selection information adding unit;

a retrieving unit for retrieving an appropriate correlated information file from an appropriate file unit among said plurality of file units according to the selection information, linkage information, and file unit specifying information read by said reader; and an output unit for outputting the correlated information file retrieved by said retrieving unit, wherein all the linkage information is provided in a page footer.

5. A computer document information management system that prepares a medium form from a hypertext, comprising:

a file unit with information concerning particular words, sentences, symbols, or graphics previously stored therein as a correlated information file;

a medium form, generated from the hypertext, with at least one described information comprising any of words, sentences, symbols, and graphics, linkage information for linking said described information to the correlated information file in said file unit, and selection information for selecting particular described information among said described information recorded thereon;

a correlated information identifying unit for reading image data from said medium form, identifying the correlated information file according to the selection information as well as the linkage information in said read image data, and outputting an address of an appropriate correlated information file;

a correlated information file retrieving unit for receiving an address of a correlated information file from said correlated information identifying unit and retrieving the appropriate correlated information file from said file unit according to the address of said correlated information file; and an output unit for outputting the correlated information file retrieved by said correlated information file retrieving unit, wherein all the linkage information is provided in a page footer.

6. A computer document information management system that prepares a medium form from a hypertext, comprising:

a file unit with information relating to particular words, sentences, symbols, or graphics previously stored therein as a correlated information file;

a medium form, generated from the hypertext, with at least one described information comprising any of words, sentences, symbols, and graphics, linkage information for linking said described information to the correlated information file in said file unit, and selection information for selecting particular described information among said described information recorded thereon;

an image data reader for reading image data from said medium form a correlated information file identifying/retrieving unit for receiving the image data from said image data reader, identifying an address of the correlated information file according to the selection information and linkage information in said image data, and retrieving an appropriate correlated information file from said file unit; and an output unit for outputting the correlated information file retrieved by said correlated information file identifying/retrieving unit, wherein all the linkage information is provided in a page footer.

7. A computer document information management system that prepares a medium form from a hypertext, comprising:

a file unit with information relating to particular words, sentences, symbols, or graphics previously stored therein as a correlated information file;

a medium form, generated from the hypertext, with at least one described information comprising any of words, sentences, symbols, and graphics, linkage information for linking said described information to the correlated information file in said file unit, and selection information for selecting particular described information among said described information recorded thereon;

a correlated information identifying unit for reading image data from said medium form, identifying the correlated information file according to the selection information as well as linkage information in said read image data, and outputting an address of an appropriate correlated information file;

a correlated information file retrieving unit for receiving an address of the correlated information file from said correlated information identifying unit and retrieving an appropriate correlated information file from said file unit according to the address of said correlated information file;

an image data reader for reading image data from said medium form;

a correlated information file identifying/retrieving unit for receiving image data from said image data reader, identifying an address of the selected correlated information file according to the selection information and linkage information in said image data, and retrieving the appropriate correlated information file from said file unit; and an output unit for outputting the correlated information file retrieved by said correlated information file retrieving unit or said correlated information file identifying/retrieving unit, wherein all the linkage information is provided in a page footer.

8. A document information management method that prepares a medium form from a hypertext, comprising:

preparing the hypertext;

storing, in a file unit, the prepared hypertexts and correlated information files correlated to each other through link structure of said hypertexts;

receiving said hypertext, preparing image extraction information from the hypertext for printing, preparing particular described information as well as linkage information for linking said described information to a correlated information file in the file unit from information having link structure, and preparing medium form information by synthesizing said image extraction information, described information, and linkage information;

printing said medium form information on recording paper and outputting the recording paper as a medium form;

adding selection information for selecting a desired described information from those printed on said medium form;

reading said selection information and linkage information from said medium form with the added selection information;

retrieving an appropriate correlated information file from said file unit according to the selection information as well as the read linkage information; and outputting the retrieved correlated information file;

wherein said linkage information includes described position information indicating a described position of each described information on said medium form and description recognizing information for recognizing described information described at a position indicated by said described position information, and said retrieving uses an intermediate address table for converting said description recognizing information to an address of said correlated information file.

9. A document information management method that prepares a medium form from a hypertext, comprising:

storing, in a plurality of file units, hypertexts and correlated information files correlated to each other through link structure of said hypertexts;

receiving said hypertext and preparing image extraction information from the hypertext for printing, preparing particular described information as well as linkage information for linking said described information to a correlated information file in a particular file unit among the plurality of file units from the information having link structure, further specifying a file unit in which the appropriate hypertext is stored from the plurality of file units, and preparing the medium form information by synthesizing said image extraction information, described information, linkage information, and file unit specifying information;

printing said medium form information on recording paper and outputting the recording paper as a medium form;

adding selection information for selecting desired described information from those printed on said medium form;

reading said selection information, linkage information, and file unit specifying information from said medium form with the added selection information;

retrieving an appropriate correlated information file from an appropriate file unit among the plurality of file units according to the selection information, linkage information, and read file unit specifying information; and outputting the retrieved correlated information file;

wherein said linkage information includes described position information indicating a described position of each described information on said medium form and description recognizing information for recognizing described information described at a position indicated by said described position information, and said retrieving uses an intermediate address table for converting said description recognizing information to an address of said correlated information file.

10. A document information management method that prepares a medium form from a hypertext, comprising:

preparing the hypertext;

storing, in a file unit, the prepared hypertexts and correlated information files correlated to each other through link structure of said hypertexts;

receiving said hypertext, preparing image extraction information from the hypertext for printing, preparing particular described information as well as linkage information for linking said described information to a correlated information file in the file unit from information having link structure, and preparing medium form information by synthesizing said image extraction information, described information, and linkage information;

printing said medium form information on recording paper and outputting the recording paper as a medium form;

adding selection information for selecting a desired described information from those printed on said medium form;

reading said selection information and linkage information from said medium form with the added selection information;

retrieving an appropriate correlated information file from said file unit according to the selection information as well as the read linkage information; and outputting the retrieved correlated information file, wherein all the linkage information is provided in a page footer.

11. A document information management method that prepares a medium form from a hypertext, comprising:

storing, in a plurality of file units, hypertexts and correlated information files correlated to each other through link structure of said hypertexts;

receiving said hypertext and preparing image extraction information from the hypertext for printing, preparing particular described information as well as linkage information for linking said described information to a correlated information file in a particular file unit among the plurality of file units from the information having link structure, further preparing file unit specifying information for specifying a file unit in which the appropriate hypertext is stored from the plurality of file units, and preparing the medium form information by synthesizing said image extraction information, described information, linkage information, and file unit specifying information;

printing said medium form information on recording paper and outputting the recording paper as a medium form;

adding selection information for selecting desired described information from those printed on said medium form;

reading said selection information, linkage information, and file unit specifying information from said medium form with the added selection information;

retrieving an appropriate correlated information file from an appropriate file unit among said plurality of file units according to the selection information, linkage information, and the read file unit specifying information; and outputting the retrieved correlated information file, wherein all the linkage information is provided in a page footer.

12. A document information management method that prepares a medium form from a hypertext, comprising:

storing, in a file unit, information concerning particular words, sentences, symbols, or graphics as a correlated information file;

generating a medium form from the hypertext, with at least one described information comprising any of words, sentences, symbols, and graphics, linkage information for linking said described information to the correlated information file in the file unit, and selection information for selecting particular described information among said described information recorded thereon;

reading image data from said medium form, identifying the correlated information file according to the selection information as well as the linkage information in said read image data, and outputting an address of an appropriate correlated information file;

receiving an address of a correlated information file and retrieving the appropriate correlated information file from the file unit according to the address of said correlated information file; and outputting the retrieved correlated information file, wherein all the linkage information is provided in a page footer.

13. A document information management method that prepares a medium form from a hypertext, comprising:

storing, in a file unit, information relating to particular words, sentences, symbols, or graphics as a correlated information file;

generating a medium form from the hypertext, with at least one described information comprising any of words, sentences, symbols, and graphics, linkage information for linking said described information to the correlated information file in the file unit, and selection information for selecting particular described information among said described information recorded thereon;

reading image data from said medium form;

receiving the image data from said image data reader, identifying an address of the correlated information file according to the selection information and linkage information in said image data, and retrieving an appropriate correlated information file from said file unit; and outputting the retrieved correlated information file, wherein all the linkage information is provided in a page footer.

14. A document information management method that prepares a medium form from a hypertext, comprising:

storing, in a file unit, information relating to particular words, sentences, symbols, or graphics as a correlated information file;

generating a medium form from the hypertext, with at least one described information comprising any of words, sentences, symbols, and graphics, linkage information for linking said described information to the correlated information file in the file unit, and selection information for selecting particular described information among said described information recorded thereon;

reading image data from said medium form, identifying the correlated information file according to the selection information as well as linkage information in said read image data, and outputting an address of an appropriate correlated information file;

receiving an address of the correlated information file and retrieving an appropriate correlated information file from the file unit according to the address of said correlated information file;

reading image data from said medium form;

receiving the read image data, identifying an address of the selected correlated information file according to the selection information and linkage information in said image data, and retrieving the appropriate correlated information file from the file unit; and outputting the retrieved correlated information file, wherein all the linkage information is provided in a page footer.

* * * * *